US00RE45230E

(19) United States
(12) Reissued Patent
Giannakis et al.

(10) Patent Number: US RE45,230 E
(45) Date of Reissued Patent: *Nov. 4, 2014

(54) WIRELESS COMMUNICATION SYSTEM HAVING LINEAR ENCODER

(71) Applicant: Regents of the University of Minnesota, Minneapolis, MN (US)

(72) Inventors: Georgios B. Giannakis, Minnetonka, MN (US); Yan Xin, St. Paul, MN (US); Zhengdao Wang, Ames, IA (US)

(73) Assignee: Regents of the University of Minnesota, Minneapolis, MN (US)

( * ) Notice: This patent is subject to a terminal disclaimer.

(21) Appl. No.: 13/858,734

(22) Filed: Apr. 8, 2013

Related U.S. Patent Documents

Reissue of:
(64) Patent No.: 7,292,647
Issued: Nov. 6, 2007
Appl. No.: 10/420,353
Filed: Apr. 21, 2003

U.S. Applications:
(60) Provisional application No. 60/374,886, filed on Apr. 22, 2002, provisional application No. 60/374,935, filed on Apr. 22, 2002, provisional application No. 60/374,934, filed on Apr. 22, 2002, provisional application No. 60/374,933, filed on Apr. 22, 2002, provisional application No. 60/374,981, filed on Apr. 22, 2002.

(51) Int. Cl.
*H04L 27/00* (2006.01)

(52) U.S. Cl.
USPC ..... 375/295; 375/316

(58) Field of Classification Search
USPC ..... 375/295, 316
See application file for complete search history.

(56) References Cited

U.S. PATENT DOCUMENTS

| | | | |
|---|---|---|---|
| 6,188,717 | B1 | 2/2001 | Kaiser et al. |
| 6,351,499 | B1 | 2/2002 | Paulraj et al. |
| 6,442,214 | B1 | 8/2002 | Boleskei et al. |
| 6,452,981 | B1 | 9/2002 | Raleigh et al. |
| 6,614,861 | B1 | 9/2003 | Terry et al. |
| 6,865,237 | B1 | 3/2005 | Boariu et al. |
| 6,891,897 | B1 | 5/2005 | Bevan et al. |
| 6,898,248 | B1 | 5/2005 | Elgamal et al. |

(Continued)

OTHER PUBLICATIONS

Zhengdao Wang ; Giannakis, G.B.; "Linearly Precoded or Coded OFDM against Wireless Channel Fades?," 2001 IEEE Third Workshop on Signal Processing Advances inWireless Communications, 2001. (SPAWC '01), 2001 , pp. 267-270 (Mar. 20-23, 2001).*

(Continued)

*Primary Examiner* — Shuwang Liu
*Assistant Examiner* — Nader Bolourchi
(74) *Attorney, Agent, or Firm* — Fish & Richardson P.C.

(57) ABSTRACT

In general, linear complex-field encoding techniques are proposed. For example, transmitter of a wireless communication system includes an encoder and a modulator. The encoder linearly encodes a data stream to produce an encoded data stream. The modulator to produce an output waveform in accordance with the encoded data stream for transmission through a wireless channel. The modulator generates the output waveform as a multicarrier waveform having a set of subcarriers, e.g., an Orthogonal Frequency Division Multiplexing (OFDM) waveform. The encoder linearly encodes the data stream so that the subcarriers carry different linear combinations of information symbols of the data stream.

77 Claims, 10 Drawing Sheets

(56) References Cited

U.S. PATENT DOCUMENTS

| | | | |
|---|---|---|---|
| 6,956,815 | B2 | 10/2005 | Chiodini |
| 2002/0163892 | A1 | 11/2002 | Hassibi et al. |
| 2002/0167962 | A1 | 11/2002 | Kowalski |
| 2004/0146014 | A1 | 7/2004 | Hammons, Jr. et al. |

OTHER PUBLICATIONS

3GPP-TSG-RAN-WG4; UTRA (BS) TDD; Radio Transmission and Reception. Eur. Telecommun. Standards Inst. (ETSI), Sophia Antipolis, France. [Online]. 1999, Available: http://www.etsi.org/umts, 25 pages.

Alamouti, "A Simple Transmit Diversity Scheme for Wireless Communications", *IEEE 1. Select Areas Comm,* Oct. 1998, 16:1451-1458.

Bahl et al., "Optimal decoding of linear codes for minimizing symbol error rate," *IEEE Trans on Inform. Theory,* Mar. 1974, 20:284-287.

Belfiore et al., "Optimal Linear Labeling for the Minimization of both Source and Channel Distortion," in Proc. Int. Symp. Infot. Theory, Sorrento, Italy, Jun. 25-30, 2000, 1 page.

Benedetto and Biglieri, "Principles of digital transmission with wireless applications," Kluwer Academic/ Plenum Publishers, 1999, 11 pages (Table of Contents).

Blake et al., "Algebraic-geometry codes," *IEEE Trans Inform Theory,* Oct. 1998, 44:2596-2618.

Boutros et al., "Good lattice constellations for both Rayleigh fading and Gaussian channel," *IEEE Trans. Inform. Theory,* Mar. 1996, 42:502-518.

Chen and Womell, "Analog error-correcting codes based on chaotic dynamical systems," *IEEE Trans. Commun.,* Jul. 1998, 46:881-890.

Conway and Sloane, *Sphere Packings, Lattices, and Groups,* 3rd. edition., New York: Springer-Verlag, 1998, 13 pages (Table of Contents).

Czylwik, "OFDM and related methods for broadband mobile radio channels;" in Proc. Int. Zurich Seminar on Broadband Communications, Zilrich, Switzerland, 1998, pp. 91-98.

Damen et al., "Transmit diversity using Rotated Constellations with Hadamard Transform", Proc. Adaptive Systems for SF, Com., and Control Conj., Oct. 2000, Lake Louise, Alberta, Canada, 6 pages.

Damen et al., "A construction of space-time code based on number theory," *IEEE Trans. on Infor. Theory,* Mar. 2002, pp. 753-760.

Damen et al., "Lattice codes decoder of space-time codes," *IEEE Common. Lett.,* May 2000, 4:161-163.

Daneshrad et al., "Clustered OFDM transmitter implementation," in Proc. IEEE Int. Symp. Personal, Indoor and Mobile Radio Communications, Oct. 1996, Taipei, Taiwan, 3:1064-1068.

Divsalar and Simon, "The design of trellis-coded MPSK for fading channels: performance criteria," *IEEE Trans. Commun.,* Sep. 1988, 36:1004-1021.

ETSI Normalization Committee, "Channel models for HIPERLAN/2 in different indoor scenarios," ETSI, document 3ERI085B, ETSI, Sophia-Antipolis, Valbonne, France, 1998, 8 pages.

ETSI TS 101 475 V1.2.2 (Feb. 2001) Technical Specification, Broadband Radio Access Networks (BRAN); HIPER-LAN Type 2; Physical (PHY) Layer, 2001, 41 pages.

Fincke and Pohst, "Improved methods for calculating vectors of short length in a lattice, including a complexity analysis," *ACM SIGSAM Bull.,* 1981, 15:37-44.

Forney, "Maximum-likelihood sequence estimation of digital sequences in the presence of intersymbol interference," *IEEE Trans. Inform. Theory,* 1972, IT-18:363-378.

Foschini, "Layered Space-time Architecture for Wireless Communication in a Flat Fading Environment when Using Multi-Element Antennas", *Bell Labs. Tech.,* 1996, 1:41-50.

Gamal and Hammons, "A new approach to layered space-time coding and signal processing," *IEEE Trans. On Infor. Theory,* Sep. 2001, pp. 2321-2334.

Ganesan and Stoica, "Space--time diversity," in Signal Processing Advances in Wireless and Mobile Communications, Giannakis et al., Eds., 2000, Englewood Cliffs, NJ: Prentice-Hall vol. 2, chapter 2, 31 pages.

Giannakis et al., "AMOUR generalized multicarrier transceivers for blind CDMA regardless of multipath," *IEEE Trans. Commun.,* Dec. 2000, 48: 2064-2076.

Giannakis, "Filterbanks for blind channel identification and equalization,"*IEEE Signal Processing Lett.,* Jun. 1997, 4:184-187.

Göeckel and Ananthaswamy, "On the design of multidimensional signal sets for OFDM systems," *IEEE Trans. Commun.,* Mar. 2002, 50:442-452.

Golden et al., "Detection algorithm and Initial Laboratory Results Using V-BLAST Space-Time Communication architecture," *Elec. Lett.,* vol. 35, Jan. 1999, 3 pages.

Hassibi and Vikalo, "On the expected complexity of sphere decoding," in Proc. 35th Asilomar Conf. Signals, Systems, and Computers, Oct. 29-Nov. 1, 2001, Pacific Grove, CA, 7 pages.

Helard and Le Floch, "Trellis-coded orthogonal frequency-division multiplexing for digital video transmission," in Proc. Global Telecommunications Conf., Dec. 1991, Phoenix, AZ, 2:785-791.

Henkel, "Multiple error correction with analog codes," in Proc. AAECC-6 (Lecture Notes in Computer Science). Berlin, Germany: Springer-Verlag, 1988, 357:239-249.

Henkel, "Analog codes for peak-to-average ratio reduction," in Proc. 3mlTG Conf. Source and Channel Coding, Munich, Germany, Jan. 2000, 5 pages.

Hero and Marzetta, "Cutoff rate and signal design for the quasi-static Rayleigh fading space-time channel," *IEEE Trans. Inform. Theory,* Sep. 2001, 47:2400-2416.

Hochwald and Brink, "Achieving near-capacity on a multiple-antenna channel," *IEEE Trans. Commun.,* Mar. 2003, 51:389-399.

Horn and Johnson, *Topics in Matrix Analysis,* New York: Cambridge University Press, 1991, 4 pages (Table of Contents).

Jafarkhani, "A quasi-orthogonal space-time block code," *IEEE Trans. Commun.,* 2001, 49:1-4.

Jeong and Park, "Performance evaluation of trellis-coded OFDM for digital audio broadcasting," in Proc. of the IEEE Region 10 Conf, 1999, 1:569-572.

Kaiser and Fazel, "A flexible spread spectrum multicarrier multiple-access system for multimedia applications," in Proc. 8th IEEE Int. Symp. PIMRC, 1997, 1:100-104.

Knopp and Humblet, "On coding for block fading channels;" *IEEE Trans. Inform. Theory,* Jan. 2000, 46:189-205.

Koffman and V. Roman, "Broadband wireless access solutions based on OFDM access in IEEE802.16," *IEEE Commun. Mag.,* Apr. 2002, pp. 96-103.

Kschischang et al., "Factor graphs and the sum-product algorithm," *IEEE Trans. Inform. Theory,* 2001, 47:498-519.

Li and Sidiropoulos, "Blind Digital Signal Separation Using Successive Inference Cancellation Iterative Least' Squares," *IEEE Trans. on Signal Processing,* Nov. 2000, 48:3146-3152.

Liu and Giannakis, "Unitary constellation precoding for OFDM with maximum muitipath diversity and coding gains," in Proc. of 35th Asilomar Conf., Nov. 2001, Pacific Grove, CA, 7 pages.

Liu and Giannakis, "Space-time block-coded multiple access through frequency-selective fading channels," *IEEE Trans. Commun.,* Jun. 2001, 49:1033-1044.

Liu and Giannakis, "Space-time coding and Kalman filtering for diversity transmissions through time-selective fading channels," *IEEE Trans Commun.,* Feb. 2002, 50: 183-186.

Liu et al., "Space-time coding for broadband wireless communications," in Wireless Communications and Mobile Computing, 2001, New York: Wiley, 1:33-53.

Ma and Giannakis, "Full-Rate Full-Diversity Space-Time Complex-Field Codes for Frequency- or Time-Selective Fading Channels," Proc. of 36th Asilomar Conf. on Signals, Systems, and Computers, Nov. 2002, Pacific Grove, CA, pp. 1714-1718.

Ma and Giannakis, "Complex field coded MIMO systems: performance, rate, and tradeoffs," Wireless Comm. and Mobile Computing, Nov./Dec. 2002, 2:693-717.

(56) References Cited

OTHER PUBLICATIONS

Ma and Giannakis, "Layered space-time complex field coding: full-diversity with full-rate, and tradeoffs,"Proc. of the 2nd Sensor Array and Multichannel SP Workshop, Aug. 2002, Rosslyn, VA, 442-446.
MacWilliams and Sloane, *The Theory of Error-Correcting Codes,* Amsterdam, The Netherlands: Holland, 1977, 7 pages (Table of Contents).
Marshall, "Coding of real-number sequences for error correction: A digital signal processing problem," *IEEE J. Select. Areas Commun.,* Mar. 1984, 2:381-392.
Marzetta and Hochwald, "Capacity of a mobile multiple antenna communications link in Rayleigh lat fading," *IEEE Trans. Inform. Theory,* Oct. 1999, 45:139-157.
Mollin, Algebraic Number Theory, London, U.K.: Chapman and Hall, 1999. 5 pages (Table of Contents).
Muquet et al., "Cyclic prefixing or zero padding for Wireless multicarrier transmissions?," *IEEE Transactions on Communications,* 2002, 50(12):2136-2148.
Murnaghan, *Lectures on Applied Mathematics: The Unitary and Rotation Groups,*Washington, DC: Spartan Books, 1962, vol. III, 3 pages (Table of Contents).
Part 11: Wireless LAN Medium Access Control (MAC) and Physical Layer (PHY) Specifications High-speed Physical Layer in the 5 GHz Band, IEEE Std 802.11a-1999, 1999, 91 pages.
Proakis, Digital Communications, 3rd ed. New York, NY: McGraw-Hill, 1995, 10 pages (Table of Contents).
Proakis, Digital Communications, 4th ed. New York: McGraw-Hill, 2000, 9 pages (Table of Contents).
Rainish, "Diversity Transform for Fading Channels", IEEE Trans. on Comm., Dec. 1996, pp. 1653-1661.
Rappaport, *Wireless Communications: Principle and Practice,* Englewood Cliffs, NJ: Prentice-Hall, 1996, 10 pages (Table of Contents).
Roth and Seroussi, "On generator matrices of MDS codes," *IEEE Trans. Inform. Theory,* Nov. 1985, vol. IT-31: 826-830.
Sandhu and Paulraj, "Space-time block codes: a capacity perspective," *IEEE Commun. Lett.,* Dec. 2000, 4:384-386.
Sari and G. Karam, "Orthogonal frequency-division multiple access and its application to CATV network," *Eur. Trans. Telecommun.,* Nov./Dec. 1998, 9: 507-516.
Saulnier and Medley, "Performance of a spread-spectrum OFDM system in a dispersive fading channel with interference," in Proc. MILCOM Conf., 1998, pp. 679-683.
Scaglione et al., "Filterbank Transceivers Optimizing Information Rate in Block Transmissions over Dispersive Channels", *IEEE Trans. On Info. Theory,* Apr. 1999, 45(3): 1019-1032.
Scaglione et al., "Linear precoding for estimation and equalization of frequency-selective channels," in Signal Processing Advances in Wireless and Mobile Communications, ed. Giannakis et al., Upper Saddle River, NJ: Prentice Hall, 2001, vol. 1, Chapter 9, 49 pages.
Seroussi and R. M. Roth, "On MDS extensions of generalized Reed Solomon codes;" *IEEE Trans. Inform. Theory,* May 1986, IT-32: 349-354.
Shiu, "Iterative Decoding for Layered Space-Time Codes", International Conf. On Communications, Jun. 2000, New Orleans, U.S.A., pp. 297-301.
Sidiropoulos et al., "Blind PARAFAC receivers for DS-CDMA Systems," *IEEE Trans, Signal Processing,* Mar. 2000, 48 (3):810-823.
Simon and Alouini, *Digital Communications over Generalized Fading Channels: A Unified Approach to Performance Analysis,* New York: Wiley, 2000, 9 pages (Table of Content).
Singleton, "Maximum distance q-nary codes," *IEEE Trans. Inform. Theory,* Apr. 1960, vol. IT-IO:116-118.
Smimov, *Linear Algebra and Group Theory,* New York, NY: McGraw-Hill, 1962, 6 pages (Table of Contents).
Steingrimsson et al., "Soft quasi-maximum-likelihood detection for multiple-antenna channels," *Proc. Int. Conf. Communications,* May 2003, Anchorage, AK, 4: 2330-2334.
Tarokh et al., "Combined array processing and space-time coding," *IEEE Trans. on Infor. Theory,* May 1999, pp. 1121-1128.
Tarokh, N. Seshadri and A. R. Calderbank, "Space.-Time Codes for High Data Rate Wireless Communication: Performance Criterion and Code Construction," *IEEE Transactions on Information Theory,* 1998, 44(2):744-765.
van de Beek et al., "On channel estimation in OFDM systems," in Proc. Vehicular Technology Conf., Chicago, IL, Jul. 1995, 5 pages.
van der Geer, "Codes and elliptic curves," in Effective Methods in Algebraic Geometry, T. Mora and C. Traverso, Basel, Switzerland, Biridtcuser, 1991, 12 pages.
Verou, *Multi-user Detection.,* Cambridge, U.K.: Cambridge University Press, 1998, 13 pages (Table of Contents).
Vitthaladevuni and Alouini, "BER computation of generalized QAM constellation," in Proc. GLOBECOM, San Antonio, TX, Nov. 2001, pp. 632-636.
Wang and Despins, "64-QAM OFDM With TCM Coding and Waveform Shaping In A Time-Selective Rician Facing Channel," in Proc. of Int'l Zurich Seminar on Broadband Comm., Berdun, Que., Canada, 2000, pp. 257-261.
Wang and G. B. Giannakis, "Outage Mutual information of Space-Time MIMO Channels," *IEEE Trans. Infor. Theory,* 2004, 50(4):657-662.
Wang et al, "Optimality of single-carrier zero-padded block transmissions," in *Proc. Wireless Comm. and Networking Conf.,* 2002, Orlando, FL, pp. 660-664.
Washington, *Introduction to Cyclotomic Fields, Graduate Texts in Math.83,* Second edition, Springer-Verlag, 1997, 6 pages (Table of Contents).
Wei and Schlegel, "Synchronization requirements for multiuser OFDM on satellite mobile and two-path Rayleigh fading channels," *IEEE Trans. Commun.,* Feb.-Apr. 1995, 43:887-895.
Wesel and Shi, "Trellis codes for periodic erasures," *IEEE Trans. Commun.,* vol. 48, Jun. 2000, pp. 938-947.
Wolf, "Redundancy, the discrete Fourier transfonn, and impulse noise cancellation," *IEEE Trans. Commun.,* Mar. 1983, COM-31:458-461.
Wolniansky et al., "V-BLAST: An architecture for realizing very high data rates over the rich-scattering wireless channel," Proc. of URSI International Symposium Signals, Systems, and Electronics, Italy, Sep. 1998, 6 pages.
Xia and Xie, "A new coding scheme for ISI channels: Modulated codes," in *Proc. Int. Conf. Communications,* vol. 2, Vancouver, BC, Canada, 1999, pp. 828-832.
Xia et al., "Bandwidth- and Power-Efficient Multi-Carrier Multiple Access," *IEEE Transactions on Communications,* Nov. 2003, 51(11): 1828-1837.
Xin and Giannakis, "Space-Time Diversity Systems based on Linear Constellation Precoding," IEEE Transactions on Wireless Communications, Mar. 2003, 2(2):294-309.
Xin and Giannakis, "Space-Time Diversity Systems based on Unitary Constellation-Rotating Precoders," Proc. of Intl. Conf. on ASSP, May 2001, 4:2429-2432.
Xin and Giannakis, "High-rate layered space-time transmissions based on constellation-rotation," in Proc. Wireless Communications and Networking Conf., Orlando, FL, Mar. 2002, pp. 471-476.
Xin and Giannakis, "High-Rate Space-Time Layered OFDM," *IEEE Comm. Letters,* May 2002, pp. 187-189.
Xin et al., "Linear Unitary Precoders for Maximum Diversity Gains with Multiple Transmit and Receive Antennas," Proc. of 34th ASILOMAR Conf. on Signals, Systems, and Computers, published before the date of filing, pp. 1553-1557.
Yan and Blum, "Optimum space-time convolutional coes," in *Proc. IEEE Wireless Communications and Networking Conf.,* vol. 3, Chicago, IL, Sep. 2000, pp. 1351-1355.
Yee and Fettweis, "Multicarrier CDMA in indoor wireless radio networks," in *Proc. IEEE PIMRC,* Sep. 1993, pp. 109-113.
Zheng and Tse, "Optimal diversity-multiplexing tradeoff in multi-antenna channels," Proc. of the 39th Allerton Conference on Communication, Control and Computing, Monticello, IL, Oct. 2001, pp. 835-844.
Zhou et al,, "Frequency-hopped generalized MC-CDMA for multipath and interference suppression," in *Proc. MILCOM Conf.,* vol. 2, Los Angeles, CA, Oct. 22-25, 2000, pp. 937-941.

(56) References Cited

OTHER PUBLICATIONS

Zou and Wu, "COFDM: an overview," *IEEE Trans. Broadcast.,* Mar. 1995, vol. 41:1-8.
Zur Decodierung algebraischer Blockcodes über komplexen Alphabeten, Ph.D. dissertation, VDI-Verlag, Düsseldorf, Germany, 1989, 12 pages.
A. Aggarwal, S. Savage, and T. Anderson, "Understanding the Performance of TCP Pacing," in Proc. Of IEEE Infocom 00, Tel-Aviv, Israel, Mar. 2000.
A. Duel-Hallen, S. Hu, and H. Hallen, "Long-Range Prediction of Fading Signals," IEEE Signal Processing Magazine, pp. 62-75, May 2000.
A. Narula, M.D. Trott, and G.W. Wornell, "Performance Limits of Coded Diversity Methods for Transmitter Antenna Arrays," IEEE Transactions on Information Theory, vol. 45, No. 7, pp. 2418-2433, Nov. 1999.
A. Narula, M.J. Lopez, M.D. Trott, and G.W. Wornell, "Efficient Use of Side Information in Multiple-Antenna Data Transmission over Fading Channels," IEEE Journal on Selected Areas in Communications, vol. 16, No. 8, pp. 1423-1436, Oct. 1998.
A.J. Viterbi, "An Intuitive Justification and a Simplified Implementation of the MAP Decoder for Convolutional Codes," IEEE Journal on Selected Areas in Communications, vol. 16, No. 2, pp. 260-264, Feb. 1998.
A.M. Sayeed and B. Aazhang, "Joint Multipath-Doppler Diversity in Mobile Wireless Communications," IEEE Transactions On Communications, vol. 47, No. 1, pp. 123-132, Jan. 1999.
B. Hassibi and B.M. Hochwald, "High-Rate Codes that are Linear in Space and Time," IEEE Trans. On Information Theory, pp. 1-56, revised Apr. 2001; URL: http://mars.bell-labs.com/cm/ms/what/mars/index.html.
B. Le Floch, M. Alard, and C. Berrou, "Coded Orthogonal Frequency Division Multiplex," Proceedings of the IEEE, vol. 83, No. 6, pp. 982-996, Jun. 1995.
C. Berrou, A. Glavieux, and P. Thitimajsima, "Near Shannon Limit Error-Correcting Coding and Decoding: Turbo Codes (1)," in Proc. Of Intl. Conf. On Com., Geneva, Switzerland, May 1993, pp. 1064-1070.
D. Agrawal, V. Tarokh, A. Naguib, and N. Seshadri, "Space-Time Coded OFDM for High Data-Rate Wireless Communication Over Wideband Channels," Proc. Of Vehicular Technology Conf., pp. 2232-2236, Ottawa, Ont, Canada, May 18-21, 1998.
D. Dardari and V. Tralli, "High-Speed Indoor Wireless Communications at 60 GHz with Coded OFDM," IEEE Transactions on Communications, vol. 47, No. 11, pp. 1709-1721, Nov. 1999.
D. Gore, S. Sandhu, and A. Paulraj, "Delay Diversity Code for Frequency Selective Channels," Electronics Letters, vol. 37, No. 20, pp. 1230-1231, Sep. 27, 2001.
D.-S. Shiu, G.J. Foschini, M.J. Gans, and J.M. Kahn, "Fading Correlation and Its Effect on the Capacity of Multielement Antenna Systems," IEEE Transactions on Communications, vol. 48, No. 3, pp. 502-513, Mar. 2000.
E. Biglieri, J. Proakis, and S. Shamai, "Fading Channels: Information-Theoretic and Communications Aspects," IEEE Trans. On Information Theory, vol. 44, No. 6, pp. 2619-2692, Oct. 1998.
E. Lindskog and A. Paulraj, "A Transmit Diversity Scheme for Channels with Intersymbol Interference," Proceedings Of International Conference On Comm., vol. 1, pp. 307-311, Jun. 2000.
E. Visotsky and U. Madhow, "Space-Time Transmit Precoding With Imperfect Feedback," IEEE Transactions on Information Theory, vol. 47, No. 6, pp. 2632-2639, Sep. 2001.
E. Viterbo, and J. Boutros, "A Universal Lattice Code Decoder for Fading Channels," IEEE Transactions on Information Theory, vol. 45, no. pp. 1639-1642, Jul. 1999.
F.W. Vook and T.A. Thomas, "Transmit Diversity Schemes for Broadband Mobile Communication Systems," Proc. Of Vehicular Tech. Conf., vol. 6, pp. 2523-2529, Boston MA, Sep. 24-28, 2000.
G. Jongren and M. Skoglund, "Utilizing Quantized Feedback Information in Orthogonal Space-Time Block Coding," in Proceedings IEEE Global Telecommunications Conference, Nov. 27, 2000.
G. Jongren, M. Skoglund, and B. Ottersten, "Combining Transmit Antenna Weights and Orthogonal Space-Time Block Codes by Utilizing Side Information," In Proceedings of the 33rd Asilomar Conference on Signals, Systems and Computers, Oct. 23, 1999.
G. Jongren, M. Skoglund, and B. Ottersten, "Combining Transmit Beamforming and Orthogonal Space-Time Block Codes by Utilizing Side Information," IEEE Sensor Array and Multichannel Signal Processing Workshop, Mar. 14, 2000.
G.B. Giannakis and S. Zhou, "Optimal Transmit-Diversity Precoders for Random Fading Channels," in Proc. of Globecom Conf., vol. 3, San Francisco, CA, Nov. 27-Dec. 1, 2000.
G.C. Clark, Jr. et al., *Error-Correction Coding for Digital Communications,* Plenum Press, pp. 9, 10, 420.
G.J. Foschini and M.J. Gans, "On Limits of Wireless Communications in a Fading Environment When Using Multiple Antennas," Wireless Personal Communications, vol. 6, No. 3, pp. 311-335, Mar. 1998.
H. Bolcskei and A.J. Paulraj, "Space-Frequency Codes for Broadband Fading Channels," in Proc. of IEEE Int. Symposium on Information Theory, pp. 219, Washington D.C., Jun. 24-29, 2001.
H. Wang, J. Belzile, and C.L. Despins, "64-QAM OFDM With TCM Coding and Waveform Shaping in a Time-Selective Rician Facing Channel," in Proc. Of Int'l Zurich Seminar on Broadband Comm., Berdun, Que., Canada, 2000, pp. 257-261.
H.R. Sadjadpour, "Application of Turbo Codes for Discrete Multi-Tone Modulation Schemes," in Proc. Of Intl. Conf. On Com., Vancouver, Canada, 1999, vol. 2, pp. 1022-1027.
J. Hagenauer, and P. Hoeher, "A Viterbi Algorithm with Soft-Decision Outputs and Its Applications," in Proc. Of the IEEE 1989 Global Communications Conference, Dallas, Texas, pp. 1680-1686, Nov. 1989.
J. Vogt, K. Koora, A. Finger, and G. Fettweis, "Comparison of Different Turbo Decoder Realizations For IMT-2000," in Global Telecommunications Conference—GLOBECOM'99, Rio de Janeiro, Brazil, 1999, vol. 5, pp. 2704-2708.
J.K. Cavers, "Optimized Use Of Diversity Modes In Transmitter Diversity Systems," in Proc. of the Vehicular Technology Conf., vol. 3, Amsterdam, The Netherlands, 1999, pp. 1768-1773.
K.R. Narayanan et al., "Low Complexity Turbo Equalization with Binary Precoding," 5 pages, IEEE, 2000.
L. Rizzo, IP Dummynet, pp. 1-9, http://info.iet.unipi.it/luigi/ip_dummynet/.
L. Sylla, P. Fortier, and H.T. Huynh, "Performance of COFDM Using Turbo Codes," in Proc. Of IEEE Canadian Conference on Electrical and Computer Engineering, Edmonton, Alta, Canada, May 9-12, 1999.
M. Martone, "Wavelet-Based Separating Kernels for Sequence Estimation with Unknown Rapidly Time-Varying Channels," IEEE Communications Letters, vol. 3, No. 3, pp. 78-80, Mar. 1999.
M. Rouanne and D.J. Costello, Jr., "An Algorithm for Computing the Distance Spectrum of Trellis Codes," IEEE Journal on Selected Areas in Communications, vols. 7, No. 6, pp. 929-940, Aug. 1989.
M.F. Pop and N.C. Beaulieu, "Limitations of Sum-of-Sinusoids Fading Channel Simulators," IEEE Transactions On Communications, vol. 49, No. 4, pp. 699-708, Apr. 2001.
M.K. Tsatsanis and G.B. Giannakis, "Modelling and Equalization of Rapidly Fading Channels," International Journal of Adaptive Control and Signal Processing, vol. 10, pp. 159-176, 1996.
N. Al-Dhahir and A.H. Sayed, "The Finite-Length Multi-Input Multi-Output MMSE-DFE," IEEE Trans. On Signal Processing, vol. 48, No. 10, pp. 1-38, Oct. 2000.
O. Rose, "Statistical Properties of MPEG Video Traffic and Their Impact on Traffic Modeling in ATM Network," TR-101, Institute of Computer Science, University of Wurzburg, Germany, Feb. 1995, pp. 1-25.
Q. Yan and R.S. Blum, "Robust Space-Time Block Coding for Rapid Fading Channels," IEEE Global Telecommunications Conference, vol. 1, pp. 460-464, San Antonio, TX, Nov. 25-29, 2001.
R. Rajaie, H. Yu, M. Handely, and D. Estrin, "Multimedia Proxy Caching Mechanism for Quality Adaptive Streaming Applications in the Internet," Technical report 99-709, Computer Science Department, USC.

(56) References Cited

OTHER PUBLICATIONS

S. Barbarossa and F. Cerquetti, "Simple Space-Time Coded SS-CDMA Systems Capable of Perfect MUI/ISI Elimination," IEEE Communications Letters, vol. 5, No. 12, pp. 471-473, Dec. 2001.
S. Bhashyam, A.M. Sayeed, and B. Aazhang, "Time-Selective Signaling and Reception for Communication over Multipath Fading Channels," IEEE Trans. On Communications, vol. 48, No. 1, pp. 1-34, Jan. 2000.
S. Floyd, M. Handley, J. Padhye, and J. Widmer, "Equation-Based Congestion Control for Unicast Applications," in Proc. Of SIGCOMM'00.
S. Sen, J. Rexford, and D. Towsley, "Proxy Prefix Caching for Multimedia Streams," in Proc. of IEEE INFOCOM'99.
S. Zhou and G.B. Giannakis, "Optimal Transmitter Eigen-Beamforming and Space-Time Block Coding Based on Channel Correlations," IEEE Trans. Signal processing, vol. 50, No. 10, pp. 553-557, Oct. 2002.
S. Zhou, B. Muquet, and G.B. Giannakis, "Subspace-Based (Semi-) Blind Channel Estimation for Block Precoded Space-Time OFDM," IEEE Transactions on Signal Processing, vol. 50, No. 5, pp. 1215-1228, May 2002.
S. Zhou, G.B. Giannakis, and C. Le Martret "Chip-Interleaved Block-Spread Code Division Multiple Access," IEEE Transactions On Communications, vol. 50, No. 2, pp. 235-248, Feb. 2002.
S. Zhou, Z. Wang, N. Bapat, G.B. Giannakis, "Turbo Decoding of Error Control Coded and Unitary Precoded OFDM", pp. 1237-1241, University of Minnesota.
S.A. Jafar, S. Vishwanath, and A. Goldsmith, "Channel Capacity and Beamforming for Multiple Transmit and Receive Antennas with Covariance Feedback," in Proc. of International Conference on Communications, vol. 7, Helsinki, Finland, Jun. 2001.
S.L. Ariyavistakul, "Turbo Space-Time Processing to Improve Wireless Channel Capacity," IEEE Trans. On Communications, vol. 48, No. 8, pp. 1347-1359, Aug. 2000.
V. Tarokh, H. Jafarkhani, and A.R. Calderbank, "Space-Time Block Codes from Orthogonal Designs," IEEE Transactions on Information Theory, vol. 45, No. 5, pp. 1456-1467, Jul. 1999.
V.M. DaSilva and E. S. Sousa, "Fading-Resistant Modulation Using Several Transmitter Antennas," IEEE Transactions on Communications, vol. 45, No. 10, pp. 1236-1244, Oct. 1997.
W.W. Peterson et al., *Error-Correcting Codes,* Second Edition, MIT Press 1972, pp. 125, 129-131, 556.
W.-Y. Kuo and M.P. Fitz, "Design and Analysis of Transmitter Diversity Using Intentional Frequency Offset for Wireless Communications," IEEE Trans. On Vehicular Technology, vol. 46, No. 4, pp. 871-881, Nov. 1997.
X. Giraud, E. Boutillon, and J.C. Belfiore, "Algebraic Tools to Build Modulation Schemes for Fading Channels," IEEE Transactions on Information Theory, vol. 43, pp. 938-952, May 1997.
X. Ma and G.B. Giannakis, "Maximum-Diversity Transmissions Over Doubly Selective Wireless Channels," IEEE Transactions On Information Theory, vol. 49, No. 7, pp. 1832-1840, Jul. 2003.
X. Ma and G.B. Giannakis, "Maximum-Diversity Transmissions over Time-Selective Wireless Channels," Proc. of Wireless Communications and Networking Conf., Orlando, FL, Mar. 17-21, 2002, pp. 497-501.
X. Ma and G.B. Giannakis, "Space-Time Coding for Doubly-Selective Channels," Proc. Of Intl. Conf. On Circuits and Systems, Scottsdale, AZ, May 25-29, 2002, pp. III-647-III-650.
X. Ma, C. Tepedelenlioglu, G.B. Giannakis, and S. Barbarossa, "Non-Data-Aided Carrier Offset Estimators for OFDM With Null Subcarriers: Identifiability, Algorithms, and Performance," IEEE Journal on Selected Areas in Communications, vol. 19, No. 12, pp. 2504-2515, Dec. 2001.
X. Wang and H.V. Poor, "Iterative (Turbo) Soft Interface Cancellation and Decoding for Coded CDMA," IEEE Transactions on Communications, vol. 47, No. 7, pp. 1046-1061, Jul. 1999.
Y. Li, "Simplified Channel Estimation for OFDM Systems With Multiple Transmit Antennas," IEEE Transactions On Wireless Communications, vol. 1, No. 1, pp. 67-75, Jan. 2002.
Y. Liu, M. P. Fitz, and O. Y. Takeshita, "Space-Time Codes Performance Criteria and Design for Frequency Selective Fading Channels," Proc. Of International Conference on Comm., Helsinki, Finland, Jun. 11-15, 2001.
Y. Wang, Z.-L. Zhang, D. Du, and D. Su, "A Network-Conscious Approach to End-to-End Video Delivery Over Wide Area Networks Using Proxy Servers," in Proceedings of IEEE INFOCOM'98.
Y. Xin, Z. Wang, and G.B. Giannakis, "Space-Time Constellation-Rotating Codes Maximizing Diversity and Coding Gains," Proc. Of GLOBECOM, vol. 1, pp. 455-459 San Antonio, TX, Nov. 25-27, 2001.
Z. Liu, Y. Xin, and G.B. Giannakis, "Linear Constellation Precoding for OFDMW With Maximum Multipath Diversity and Coding Gains," IEEE Transactions On Communications, vol. 51, No. 3, pp. 416-427, Mar. 2003.
Z. Liu, Y. Xin, and G.B. Giannakis, "Space-Time-Frequency Block Coded OFDM with Subcarrier Grouping and Constellation Precoding," Proc. Of Intl. Conf. on ASSP, Orlando, FL, May 13-17, 2003, pp. III-2205-III-208.
Z. Liu, Y. Xin, and G.B. Giannakis, "Space-Time-Frequency Coded OFDM Over Frequency-Selective Fading Channels," IEEE Transactions on Signal Processing, vol. 50, No. 10, pp. 2465-2476, Oct. 2002.
Z. Liu, Y. Xin, and G.B. Giannakis, "Space-Time-Frequency Trellis Coding for Frequency-Selective Fading Channels", pp. 145-149, 2002.
Z. Wang and G.B. Giannakis, "Complex-Field Coding for OFDM Over Fading Wireless Channels" IEEE Transactions on Information Theory, vol. 49, No. 3, pp. 707-720, Mar. 2003.
Z. Wang and G.B. Giannakis, "Wireless Multicarrier Communications: Where Fourier Meets Shannon," IEEE Signal Processing Magazine, vol. 17, No. 3, pp. 29-48, May 2000.
Z. Wang, S. Zhou, and G.B. Giannakis, "Joint Coding-Precoding with Low Complexity Turbo-Decoding," IEEE Transactions on Wireless Communications, vol. XXX, No. XXX, pp. 1-11, Month 2003; also in Proc. Of the European Wireless Conference, Florence, Italy, Feb. 25-28.
Z.-L. Zhang, S. Nelakuditi, R. Aggarwal, and R. Tsang, "Efficient Selective Frame Discard Algorithms for Stored Video Delivery across Resource Constrained Networks," in Proc. of IEEE INFOCOM'99, pp. 1-26.
N. Al-Dhahir, "Single-Carrier Frequency-Domain Equalization for Space-Time Block-Coded Transmission over Frequency-Selective Fading Channels," IEEE Communications Letters, vol. 5, No. 7, pp. 304-306, Jul. 2001.
S. Benedetto, G. Montorsi, D. Divsalar, and F. Pollara, "A Soft-Input Soft-Output Maximum A Posterior (MAP) Module to Decode Parallel and Serial Concatenated Codes," TDA Progress Report, vol. 42-127, No. 15, 1996, downloadable from http://tmo.jpl.nasa.gov/tmo/progress_report/index.html.
J. Boutos and E. Viterbo, "Signal Space Diversity: A Power-and Bandwidth-Efficient Diversity Technique for the Rayleigh Fading Channel," IEEE Transactions on Information Theory, vol. 44, No. 4, pp. 1453-1467, Jul. 1998.
H. Bolcskei and A.J. Paulraj, "Space-Frequency Coded Broadband OFDM Systems," in Proc. of Wireless Communications and Networking Conference, vol. 1, pp. 1-6, Chicago, IL., Sep. 23-28, 2000.
D.K. Borah and B. Hart, "Receiver Structures for Time-Varying Frequency-Selective Fading Channels," IEEE Journal of Selected Areas in Communications, vol. 17, No. 11, pp. 1863-1875, Nov. 1999.
G.B. Giannakis, X. Ma, G. Leau, and S. Zhou, "Space-Time-Doppler Coding Over Time-Selective Fading Channels With Maximum Diversity And Coding Gains," Proc. Of Intl. Conf. On ASSP, Orlando, FL, May 13-17, 2002, pp. III-2217-III-2220.
G.B. Giannakis and C. Tepedelenlioglu, "Basic Expansion Models and Diversity Techniques for Blind Identification and Equalization of Time-Varying Channels," Proceedings of the IEEE, vol. 86, No. 10,pp. 1969-1986, Oct. 1998.
A. Hiroike, F. Adachi, and N. Nakajima, "Combined Effect of Phase Sweeping Transmitter Diversity and Channel Coding," IEEE Trans. On Vehicular Technology, pp. 170-176, May 1992.

(56) References Cited

OTHER PUBLICATIONS

R. Hoshyar, S.H. Jamali, and A.R.S. Bahai, "Turbo Coding Performance in OFDM Packet Transmission," in Proc. IEEE VTC, Tockyo, Japan, 2000, vol. 2, pp. 805-810.

G. Kaplan and S. Shamai, "Achievable Performance Over the Correlated Rician Channel," IEEE Transaction on Communications, vol. 42, No. 11, pp. 2967-2978, Nov. 1994.

G. Leus, S. Zhou, and G.B. Giannakis, "Multi-User Speading Codes Retaining Orthagonality through Unknown Time- and Frequency-Selective Fading," Proc. Of GLOBECOM, vol. 1, pp. 259-263, San Antonio, TX, Nov. 25-29, 2001.

B. Lu and X. Wang, "Space-Time Code Design in OFDM Systems," Proc. Of Global Telecommunications Conference, San Francisco, CA, vol. 2, pp. 1000-1004, Nov. 27-Dec. 1, 2000.

J. Mahdavi and S. Floyd, "TCP-Friendly Unicast Rate-Based Flow Control," Jan. 1997, http://www.psc.edu/networking/papers/tcp_friendly.html.

M. Mathis, J. Semke, J. Mahdavi, and T. Ott, "The Macroscopic Behavior of the TCP Congestion Avoidance Algorithm," Computer Communication Review, Vo. 27, No. 3, Jul. 1997, pp. 1-16.

B. Muquet, M. de Courville, G.B. Giannakis, Z. Wang, and P. Duhamel, "Reduced Complexity Equalizers For Zero-Padded OFDM Transmission".

A.F. Naguib, "On The Matched Filter Bound of Tranmit Diversity Techniques," IEEE International Conference on Communications, vol. 2, pp. 596-603, Helsinki, Finland, Jun. 11-14, 2001.

S. Ohno and G.B. Giannakis, "Optimal Training and Redundant Precoding for Block Transmission With Application to Wireless OFDM," IEEE Transaction on Communications, vol. 50, No. 12, pp. 2113-2123, Dec. 2002.

R. Rajaie, M. Handely, and D. Estrin, "Quality Adaptation for Congestion Controlled Video Playback over the Internet," in Proc. of SIGCOMM'99, pp. 1-16.

A. Ruiz, J.M. Cioffi, and S. Kasturia, "Discrete Multiple Tone Modulation with Coset Coding for the Spectrally-Shaped Channel," IEEE Transactions on Communications, vol. 40, No. 6, pp. 1012-1029, Jun. 1992.

A. Stamoulis, G.B. Giannakis, and A. Scaglione, "Block FIR Decision-Feedback Equalizers for Filterbank Precoded Transmissions with Blind Channel Estimation Capabilitites," IEEE Transactions On Communications, vol. 49, No. 1, pp. 69-83, Jan. 2001.

C. Tepedelenlioglu and G.B. Giannakis, "Transmitter Redundancy for Blind Estimation and Equalization of Time- Frequency-Selective Channels," IEEE Transactions On Signal Processing, vol. 48, No. 7, pp. 2029-2043, Jul. 2000.

Z. Wang and G.B. Giannakis, "Linearly Precoded or Coded OFDM against Wireless Channel Fades?" in Third IEEE Signal Processing Workshop on Signal Processing Advances in Wireless Communication, Taoyuan, Taiwan, Mar. 20-23, 2001.

A. Wiineben, "A New Bandwidth Efficient Transmit Antenna Modulation Diversity Scheme for Linear Digital Modulation," Proc. of IEEE International Conference on Comm., vol. 3, pp. 1630-1634, Geneva, Switzerland, May 23-26, 1993.

S. Zhou and G.B. Giannakis, "Space-Timecoding With Maximum Diversity Gains Over Frequency-Selective Fading Channels," IEEE Signal Processing Letters, vol. 8, No. 10, pp. 369-272, Oct. 2001.

* cited by examiner

NEW

NEW

WIRELESS COMMUNICATION SYSTEM HAVING LINEAR ENCODER

Matter enclosed in heavy brackets [ ] appears in the original patent but forms no part of this reissue specification; matter printed in italics indicates the additions made by reissue.

This application claims priority from U.S. Provisional Application Ser. No. 60/374,886, filed Apr. 22, 2002, U.S. Provisional Application Ser. No. 60/374,935, filed Apr. 22, 2002, U.S. Provisional Application Ser. No. 60/374,934, filed Apr. 22, 2002, U.S. Provisional Application Ser. No. 60/374,981, filed Apr. 22, 2002, U.S. Provisional Application Ser. No. 60/374,933, filed Apr. 22, 2002, the entire contents of which are incorporated herein by reference.

STATEMENT REGARDING FEDERALLY SPONSORED RESEARCH OR DEVELOPMENT

This invention was made with [Government] *government* support under [Contract No.] ECS-9979443[,] awarded by the National Science Foundation[, and Contract No.] DAAG55-98-1-0336 (University of Virginia Subcontract No. 5-25127) awarded by the U.S. Army. The [Government may have] *government has* certain rights in this invention.

TECHNICAL FIELD

The invention relates to communication systems and, more particularly, transmitters and receivers for use in wireless communication systems.

BACKGROUND

In wireless mobile communications, a channel that couples a transmitter to a receiver is often time-varying due to relative transmitter-receiver motion and multipath propagation. Such a time-variation is commonly referred to as fading, and may severely impair system performance. When a data rate for the system is high in relation to channel bandwidth, multipath propagation may become frequency-selective and cause intersymbol interference (ISI). By implementing Inverse Fast Fourier Transform (IFFT) at the transmitter and FFT at the receiver, Orthogonal Frequency Division Multiplexing (OFDM) converts an ISI channel into a set of parallel ISI-free subchannels with gains equal to the channel's frequency response values on the FFT grid. Each subchannel can be easily equalized by a single-tap equalizer using scalar division.

To avoid inter-block interference (IBI) between successive IFFT processed blocks, a cyclic prefix (CP) of length greater than or equal to the channel order is inserted per block at the transmitter and discarded at the receiver. In addition to suppressing IBI, the CP also converts linear convolution into cyclic convolution and thus facilitates diagonalization of an associated channel matrix (*Z. Wang and G. B. Giannakis, "Wireless multicarrier communications: where Fourier meets Shannon," IEEE Signal Processing Magazine, vol. 47, no. 3, pp. 29-48, May 2000, herein incorporated by reference*).

Instead of having multipath diversity in the form of (superimposed) delayed and scaled replicas of the transmitted symbols as in the case of serial transmission, OFDM transfers the multipath diversity to the frequency domain in the form of (usually correlated) fading frequency response. Each OFDM subchannel has its gain being expressed as a linear combination of the dispersive channel taps. When the channel has nulls (deep fades) close to or on the FFT grid, reliable detection of the symbols carried by these faded subcarriers becomes difficult if not impossible.

Error-control codes are usually invoked before the IFFT processing to deal with the frequency-selective fading. These include convolutional codes, Trellis Coded Modulation (TCM) or coset codes, Turbo-codes, and block codes (e.g., Reed-Solomon or BCH). Such coded OFDM schemes often incur high complexity and/or large decoding delay (*Y. H. Jeong, K. N. Oh, and J. H. Park, "Performance evaluation of trellis-coded OFDM for digital audio broadcasting," in Proc. of the IEEE Region 10 Conf, 1999, vol. 1, pp. 569-572, herein incorporated by reference*). Some of these schemes also require Channel State Information (CSI) at the transmitter (*A. Ruiz, J. M. Cioffi, and S. Kasturia, "Discrete multiple tone modulation with coset coding for the spectrally shaped channel," IEEE Transactions on Communications, vol. 40, no. 6, pp. 1012-1029, June 1992, herein incorporated by reference; H. R. Sadjadpour, "Application of Turbo codes for discrete multi-tone modulation schemes," in Proc. of Intl. Conf. on Com., Vancouver, Canada, 1999, vol. 2, pp. 1022-1027, herein incorporated by reference*), which may be unrealistic or too costly to acquire in wireless applications where the channel is rapidly changing. Another approach to guaranteeing symbol detectability over ISI channels is to modify the OFDM setup: instead of introducing the CP, each IFFT-processed block can be zero padded (ZP) by at least as many zeros as the channel order (*B. Muquet, Z. Wang, G. B. Giannakis, M. de Courville, and P. Duhamel, "Cyclic prefixed or zero padded multicarrier transmissions?" IEEE Transactions on Communications, August 2000 (to appear), herein incorporated by reference; Z. Wang and G. B. Giannakis, "Wireless multicarrier communications: where Fourier meets Shannon," IEEE Signal Processing Magazine, vol. 47, no. 3, pp. 29-48, May 2000, herein incorporated by reference*).

SUMMARY

In general, techniques are described for robustifying multicarrier wireless transmissions, e.g., OFDM, against random frequency-selective fading by introducing memory into the transmission with complex field (CF) encoding across the subcarriers. Specifically, instead of sending a different uncoded symbol per subcarrier, the techniques utilize different linear combinations of the information symbols on the subcarriers. These techniques generalize signal space diversity [concepts to allow for redundant encoding] (*J. Boutros and E. Viterbo, "Signal space diversity: A power and bandwidth efficient diversity technique for the Rayleigh fading channel," IEEE Transactions on Information Theory, vol. 44, pp. 1453-1467, July 1998, herein incorporated by reference*) *concepts to allow for redundant encoding*. The CF block code described herein can also be viewed as a form of real-number or analog codes (*W. Henkel, Zur Decodierung algebraischer Blockcodes über komplexen Alphabeten, Ph.D. thesis, VDI Fortschritt-Berichte, Reihe 10, Nr. 109, VDI-Verlag, Düsseldorf, 1989, herein incorporated by reference; T. G. Marshall Jr., "Coding of real-number sequences for error correction: A digital signal processing problem," IEEE Journal on Selected Areas in Communications, vol. 2, no. 2, pp. 381-392, March 1984 herein incorporated by reference; J. K. Wolf, "Redundancy, the discrete Fourier transform, and impulse noise can-*

*cellation," IEEE Transactions on Communications, vol. 31, no. 3, pp. 458-461, March 1983, herein incorporated by reference*).

The encoder described herein is referred to as a "Linear Encoder (LE),"0 and the corresponding encoding process is called "linear encoding," also abbreviated as LE when no confusions arise. The resulting CF coded OFDM will be called LE-OFDM. In one embodiment, the linear encoder is designed so that maximum diversity order can be guaranteed without an essential decrease in transmission rate.

By performing pairwise error probability analysis, we upper bound the diversity order of OFDM transmissions over random frequency-selective fading channels. The diversity order is directly related to a Hamming distance between the coded symbols. Moreover, the described LE can be designed to guarantee maximum diversity order irrespective of the information symbol constellation with minimum redundancy. In addition, the described LE codes are maximum distance separable (MDS) in the real or complex field, which generalizes the well-known MDS concept for Galois field (GF) codes (*F. J. MacWilliams and N. J. A. Sloane, The Theory of Error-Correcting Codes, Amsterdam: North-Holland, 1977, herein incorporated by reference*). Two classes of LE codes are described that can achieve MDS and guarantee maximum diversity order: the Vandermonde class, which generalizes the Reed-Solomon codes to the real/complex field, and the Cosine class, which does not have a GF counterpart.

Several possible decoding options have been described, including ML, ZF, MMSE, DFE, and iterative detectors. Decision directed detectors may be used to strike a trade-off between complexity and performance.

In one embodiment, a wireless communication device comprises an encoder that linearly encodes a data stream to produce an encoded data stream, and a modulator to produce an output waveform in accordance with the encoded data stream for transmission through a wireless channel.

In another embodiment, a wireless communication device comprises a demodulator that receives a waveform carrying a linearly encoded transmission and produces a demodulated data stream, and a decoder that applies decodes the demodulated data and produce estimated data.

In another embodiment, a method comprises linearly encoded a data stream with to produce an encoded data stream, and outputting a waveform in accordance with the data stream for transmission through a wireless channel.

In another embodiment, a computer-readable medium comprises instructions to cause a programmable processor to linearly encode a data stream with to produce an encoded data stream, and output a waveform in accordance with the data stream for transmission through a wireless channel.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
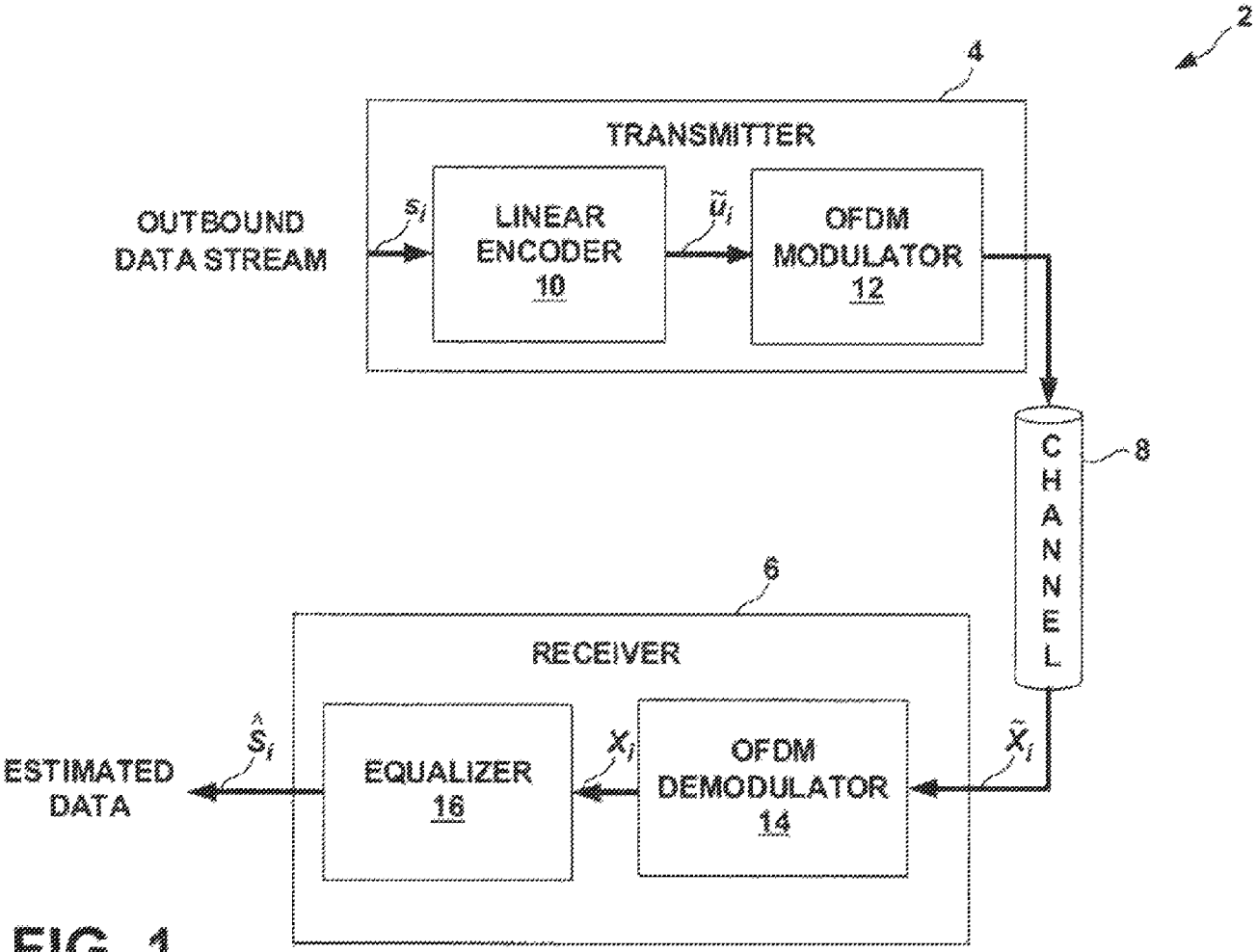
FIG. 1 is a block diagram illustrating an exemplary wireless communication system in which a transmitter and receiver implement linear precoding techniques.

FIG. 1 is a block diagram illustrating a telecommunication system 2 in which transmitter 4 communicates data to receiver 6 through wireless channel 8. Transmitter 4 transmits data to receiver 6 using one of a number of conventional multi-carrier transmission formats including Orthogonal Frequency Division Multiplexing (OFDM). OFDM has been adopted by many standards including digital audio and video broadcasting (DAB, DVB) in Europe and high-speed digital subscriber lines (DSL) in the United States. OFDM has also been proposed for local area mobile wireless broadband standards including IEEE802.11a, MMAC and HIPERLAN/2. *[ETSI, "Broadband Radio Access Networks (BRAN); HIPERLAN Type 2 technical specification Part 1—physical layer," DTS/BRAN030003-1, October 1999]*. In one embodiment, system 2 represents an LE-OFDM system having N subchannels.

In general, the techniques described herein robustify multi-carrier wireless transmissions, e.g., OFDM, against random frequency-selective fading by introducing memory into the transmission with complex field (CF) encoding across the subcarriers. In particular, transmitter 4 utilizes different linear combinations of the information symbols on the subcarriers. The techniques described herein may be applied to uplink and/or downlink transmissions, i.e., transmissions from a base station to a mobile device and vice versa. Consequently, transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), and the like.

In the illustrated embodiment, transmitter 4 includes linear encoder 10 and an OFDM modulator 12. Receiver 6 includes OFDM demodulator 14 and equalizer 16. Due to CP-insertion at transmitter 44 and CP-removal at receiver 6, the dispersive channel 8 is represented as an N×N circulant matrix $\tilde{H}$, with $[\tilde{H}]_{i,j}=h((i-j)\bmod N)$, where $h(\cdot)$ denotes the impulse response (*Z. Wang and G. B. Giannakis, "Wireless multicarrier communications: where Fourier meets Shannon," IEEE Signal Processing Magazine, vol. 47, no. 3, pp. 29-48, May 2000, herein incorporated by reference*) of channel 8:

$$H=\begin{bmatrix} h(0) & 0 & \cdots & & 0 & h(L) & \cdots & h(1) \\ \vdots & h(0) & 0 & \cdots & & \ddots & \ddots & \vdots \\ & & & & & & & h(L) \\ h(L) & \vdots & \ddots & \ddots & & \cdots & 0 & 0 \\ 0 & h(L) & & \ddots & 0 & & & 0 \\ \vdots & 0 & & & h(0) & \ddots & & \vdots \\ & \vdots & \ddots & \ddots & \vdots & \ddots & & 0 \\ 0 & \cdots & & 0 & h(L) & & \cdots & h(0) \end{bmatrix} \quad (1)$$

We assume the channel to be random FIR, consisting of no more than L+1 taps. The blocks within the dotted box represent a conventional uncoded OFDM system.

Let F denote the N×N FFT matrix with entries $[F]_{n,k}=(1/\sqrt{N})\exp(-j2\pi nk/N)$. Performing IFFT (postmultiplication with the matrix $F^H$) at the transmitter and FFT (premultiplication with the matrix F) at the receiver diagonalizes the circulant matrix $\tilde{H}$. So, we obtain the parallel ISI-free model for the ith OFDM symbol as (see FIG. 1): $x_i=D_H u_i+\eta_i$, where $$D_H := \mathrm{diag}\left[H(j0)\cdot H\left(j2\pi\frac{1}{N}\right), \ldots, H\left(j2\pi\frac{N-1}{N}\right)\right] = F^H\tilde{H}F,$$

with $H(j\omega)$ denoting the channel frequency response at $\omega$; and $\eta_i=F\eta_i$ standing for the FFT-processed additive white Gaussian noise (AWGN).

In order to exploit the frequency-domain diversity in OFDM, our LE-OFDM design first linearly encodes (i.e., maps) the K≤N symbols of the ith block, $s_i\epsilon\delta$, where $\delta$ is the set of all possible vectors that $s_i$ may belong to (e.g., the BPSK set $\{\pm1\}^{K\times1}$), by an N×K matrix $\Theta\epsilon C^{N\times K}$ and then multiplexes the coded symbols $u_i=\Theta s_i\epsilon C^{N\times1}$ using conventional OFDM. In practice, the set $\delta$ is always finite. But we allow it to be infinite in our performance analysis. The encoder $\Theta$ considered here does not depend on the OFDM symbol index i. Time-varying encoder may be useful for certain purposes (e.g., power loading), but they will not be pursued here. Hence, from now on, we will drop our OFDM symbol index i for brevity.

Notice that the matrix-vector multiplication used in defining $u=\Theta s$ takes place in the complex field, rather than a Galois field. The matrix $\Theta$ can be naturally viewed as the generating matrix of a complex field block code. The codebook is defined as $\mathfrak{U}:=\{\Theta s|s\epsilon\delta\}$. By encoding a length-K vector to a length-N vector, some redundancy is introduced that we quantify by the rate of the code defined to be r=K/N, reminiscent of the GF block code rate definition. The set $\mathfrak{U}$ is a subset of the $C^{N\times1}$ vector space. More specifically, $\mathfrak{U}$ is a subset of the K dimensional subspace spanned by the columns of $\Theta$. When $\delta=Z^{K\times1}$, the set $\mathfrak{U}$ forms a lattice (*J. H. Conway and N. J. A. Sloane, Sphere Packings, Lattices, and Groups, Springer-Verlag, 3rd edition, December 1998, herein incorporated by reference*).

Combining the encoder with the diagonalized channel model, the ith received block after CP removal and FFT processing can be written as:

$$x=F\tilde{x}=F(\tilde{H}F^H\Theta s+\tilde{n})=D_H\Theta s+\eta. \quad (2)$$

We want to design $\Theta$ so that a large diversity order can be guaranteed irrespective of the constellation that the entries of $s_i$ are drawn from, with a small amount of introduced redundancy.

We can conceptually view $\Theta$ together with the OFDM modulation $F^H$ as a combined N×K encoder $\tilde{\Theta}:=F^H\Theta$, which in a sense blends the single-carrier and multicarrier notions. Indeed, by selecting $\Theta$, hence $\tilde{\Theta}$, the system in FIG. 1 can describe various single and multicarrier systems, some of them are provided shortly as special cases of our LE-OFDM. The received vector $\tilde{x}$ is related to the information symbol vector s through the matrix product $\tilde{H}\Theta$.

We define the Hamming distance $\delta(u, u')$ between two vectors u and u' as the number of non-zero entries in the vector $u_c=u-u'$ and the minimum Hamming distance of the set $\mathfrak{U}$ as $\delta_{min}(\mathfrak{U}):=\min\{\delta(u, u')|u, u\epsilon\mathfrak{U}\}$. When there is no confusion, we will simply use $\delta_{min}$ for brevity. The minimum Euclidean distance between vectors in $\mathfrak{U}$ is denoted as $d_{min}(\mathfrak{U})$ or simply $d_{min}$.

Because such encoding operates in the complex field, it does not increase the dimensionality of the signal space. This is to the contrasted to the GF encoding: the codeword set of a GF (n, k) code, when viewed as a real/complex vector, in general has a higher dimensionality (n) than does the original uncoded block of symbols (k). Exceptions include the repetition code, for which the codeword set has the same dimensionality as that of the input.

EXAMPLE 1

Consider the binary (3, 2) block code generated by the matrix $$\begin{bmatrix}1 & 0 & 1\\ 0 & 1 & 1\end{bmatrix}^T \quad (3)$$

followed by BPSK constellation mapping (e.g., 0→−1 and 1→1). The codebook consists of 4 codewords $$[-1\ -1\ -1]^T, [1\ -1\ 1]^T, [-1\ 1\ 1]^T, [1\ 1\ -1]^T. \quad (4)$$

Figure 2A:
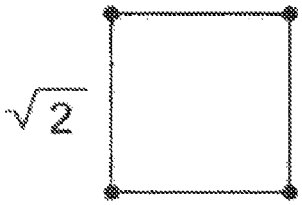
FIGS. 2A, 2B illustrate uncoded and GF-coded BPSK signals.
Figure 2B:
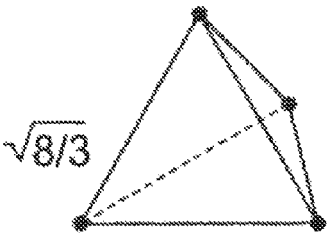

These codewords span the $R^{3\times1}$ (or $C^{3\times1}$) space and therefore the codebook has dimension 3 in the real or complex field, as illustrated in FIG. 2.

In general, a (n, k) binary GF block code is capable of generating $2^k$ codewords in an n-dimensional space $R^{n\times1}$ or $C^{n\times1}$. If we view the transmit signal design problem as packing spheres in the signal space (Shannon's point of view), an (n, k) GF block code followed by constellation mapping packs spheres in an n-dimensional space and thus has the potential to be better (larger sphere radius) than a k-dimensional packing. In our example above, if we normalize the codewords by a factor $\sqrt{2/3}$ so that the energy per bit $E_b$ is one, the 4 codewords have mutual Euclidean distance $\sqrt{8/3}$, larger than the minimum distance $\sqrt{2}$ of the uncoded BPSK signal set (±1,±1). This increase in minimum Euclidean distance leads to improved system performance in AWGN channels, at least for high signal to noise ratio (SNR). For fading channels, the minimum Hamming distance of the codebook dominates high SNR performance in the form of diversity gain (as will become clear later). The diversity gain achieved by the (3, 2) block code in the example is the minimum Hamming distance 2.

CF linear encoding on the other hand, does not increase signal dimension; i.e., we always have dim(U)≤dim(S). When $\Theta$ has full column rank K, dim(U)=dim(S), in which case the codewords span a K-dimensional subspace of the N-dimensional vector space $C^{K\times1}$. In terms of sphere packing, CF linear encoding does not yield a packing of dimension higher than K.

We have the following assertion about the minimum Euclidean distance.

Proposition 1 Suppose $tr(\Theta\Theta^H)=K$. If the entries of $s\epsilon\delta$ are drawn independently from a constellation $\mathcal{A}$ of minimum Euclidean distance of $d_{min}(\mathcal{A})$ then the codewords in $u:=\{\Theta s|s\epsilon\delta\}$ have minimum Euclidean distance no more than $d_{min}(\mathcal{A})$.

Proof: Under the power constraint $tr(\Theta\Theta^H)=K$, at least one column of $\Theta$ will have norm no more than 1. Without loss of generality, suppose the first column has norm no more than 1. Consider $s_\alpha=(\alpha, 0, \ldots, 0)^T$ and $s_\beta=(\beta, 0, \ldots, 0)^T$, where $\alpha$ and $\beta$ are two symbols from the constellation that are separated by $d_{min}$. The coded vectors $u_\alpha=\Theta s_\alpha$ and $u_\beta=\Theta s_\beta$ are then separated by a distance no more than $d_{min}$.

Due to Proposition 1, CF linear codes are not effective for improving performance for AWGN channels. But for fading channels, they may have an advantage over GF codes, because they are capable of producing codewords that have large Hamming distance.

EXAMPLE 2

The encoder $$\Theta = \sqrt{\frac{4}{15}}\begin{bmatrix} 1 & 1 & 1 \\ 0.5 & -0.5 & 0.5 \end{bmatrix}^T, \tag{5}$$

operating on BPSK signal set $\delta=\{\pm 1\}^2$, produces 4 codewords of minimum Euclidean distance $\sqrt{4/5}$ and minimum Hamming distance 3. Compared with the GF code in Example 1, this real code has smaller Euclidean distance but larger Hamming distance. In addition, the CF coding scheme described herein differs from the GF block coding in that the entries of the LE output vector u usually belong to a larger, although still finite, alphabet set than do the entries of the input vector s (*W. Henkel, Zur Decodierung algebraischer Blockcodes über komplexen Alphabeten, Ph.D. thesis, VDI Fortschritt-Berichte, Reihe 10, Nr. 109, VDI-Verlag, Düsseldorf, 1989, herein incorporated by reference*).

Before exploring optimal designs of $\Theta$, let us first look at some special cases of the LE-OFDM system.

By setting K=N and $\Theta=I_N$, we obtain the conventional uncoded OFDM model. In such a case, the one-tap linear equalizer matrix $\Gamma=D_H^{-1}$ yields $\hat{s}=\Gamma x=s+D_H^{-1}\eta$, where the inverse exists when the channel has no nulls on the FFT grid. Under the assumption that $\tilde{n}$ (hence $\eta$) is AWGN, such an equalizer followed by a minimum distance quantizer is optimum in the maximum-likelihood (ML) sense for a given channel when CSI has been acquired at the receiver. But when the channel has nulls on (or close to) the FFT grid $\omega=2\pi n/N$, $n=0, \ldots, N-1$, the matrix $D_H$ will be ill-conditioned and serious noise-amplification will emerge if we try to invert $D_H$ (the noise variance can become unbounded). Although events of channel nulls being close to the FFT grid have relatively low probability, their occurrence is known to have dominant impact on the average system performance especially at high SNR. Improving the performance of an uncoded transmission thus relies on robustifying the system against the occurrence of such low-probability but catastrophic events. If CSI is available at the transmitter, power and bit loading can be used and channel nulls can be avoided, such as in discrete multitone (DMT) systems (*A. Ruiz, J. M. Cioffi, and S. Kasturia, "Discrete multiple tone modulation with coset coding for the spectrally shaped channel," IEEE Transactions on Communications, vol. 40, no. 6, pp. 1012-1029, June 1992, herein incorporated by reference*).

Figure 3:
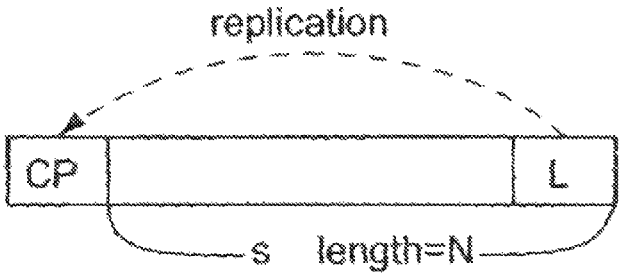
FIG. 3 illustrates an example format of a transmission block for CP-only transmissions by the transmitter of FIG. 1.
Figure 4:
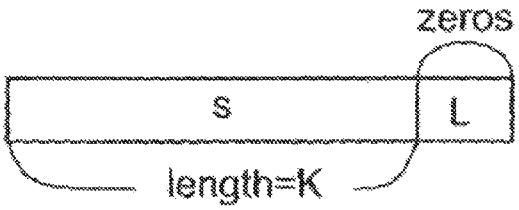
FIG. 4 illustrates an example format of a transmission block for ZP-only transmissions by the transmitter of FIG. 1.

If we choose K=N and $\Theta$=F, then since $F^HF=I_N$, the IFFT $F^H$ reverses the encoding and the resulting system is a single-carrier block transmission with CP insertion (c.f., FIG. 3): $\tilde{x}=\tilde{H}s+\tilde{\eta}$. The FFT at the receiver is no longer necessary (*A. Czylwik, "OFDM and related methods for broadband mobile radio channels," in International Zurich Seminar on Broadband Communications, 1998, pp. 91-98, herein incorporated by reference; Z. Wang and G. B. Giannakis, "Wireless multicarrier communications: where Fourier meets Shannon," IEEE Signal Processing Magazine, vol. 47, no. 3, pp. 29-48, May 2000, herein incorporated by reference*).

Let K=N−L. We choose $\Theta$ to be an N×K truncated FFT matrix (the first K columns of F); i.e., $[\Theta]_{n,k}=(1/\sqrt{N})\exp(-j2\pi nk/N)$. It can be easily verified that $F^H\Theta=[I_K, 0_{K\times L}]^T:=T_{zp}$, where $0_{K\times L}$ denotes a K×L all-zero matrix, and the subscript "zp" stands for zero-padding (ZP). The matrix $T_{zp}$ simply pads zeros at the tail of s and the zero-padded block $\tilde{u}=T_{zp}s$ is transmitted. Notice that $H:=\tilde{H}F^H\Theta=\tilde{H}T_{zp}$ is an N×K Toeplitz convolution matrix (the first K columns of $\tilde{H}$), which is always full rank. The symbols s can thus always be recovered from the received signal $\tilde{x}=Hs+\tilde{n}$ (perfectly in the absence of noise) and no catastrophic channels exist in this case (*Z. Wang and G. B. Giannakis, "Wireless multicarrier communications: where Fourier meets Shannon," IEEE Signal Processing Magazine, vol. 47, no. 3, pp. 29-48, May 2000, herein incorporated by reference*). The cyclic prefix in this case consists of L zeros, which, together with the L zeros from the encoding process, result in 2L consecutive zeros between two consecutive uncoded information blocks of length K. But only L zeros are needed in order to separate the information blocks. CP is therefore not necessary because the L zeros created by $\Theta$ already separate successive blocks.

ZP-only transmission is essentially a simple single-carrier block scheme. However, viewing it as a special case of the LE-OFDM design will allow us to apply the results about LE-OFDM and gain insights into its performance. It turns out that this special case is indeed very special: it achieves the best high-SNR performance among the LE-OFDM class.

To design linear encoder 10 with the goal of improving performance over uncoded OFDM, we utilize pair-wise error probability (PEP) analysis technique (*V. Tarokh, N. Seshadri, and A. R. Calderbank, "Space-time codes for high data rate wireless communication: Performance criterion and code construction," IEEE Transactions on Information Theory, vol. 44, no. 2, pp. 744-765, March 1998, herein incorporated by reference*). For simplicity, we will first assume that As 1) The channel $h:=[h(0), h(1), \ldots, h(L)]^T$ has independent and identically distributed (i.i.d.) zero-mean complex Gaussian taps (Rayleigh fading). The corresponding correlation matrix of h is $R_h:=E[hh^H]=\alpha_L^2 I_{L+1}$, where the constant $\alpha_L:=1/(L+1)$.

Later on, we will relax this assumption to allow for correlated fading with possibly rank deficient autocorrelation matrix $R_h$.

We suppose ML detection with perfect CSI at the receiver and consider the probability $P(s\rightarrow s'|h)$, $s, s'\epsilon\delta$ that a vector s is transmitted but is erroneously decoded as $s'\neq s$. We define the set of all possible error vectors $\delta_e:=\{e:=s-s'|s.s'\epsilon\delta, s\neq s'\}$.

The PEP can be approximated using the Chernoff bound as:

$$P(s\rightarrow s'|h)\leq\exp(-d^2(y,y')/4N_0), \tag{6}$$

where $N_0/2$ is the noise variance per dimension, $y:=D_H\Theta s$, $y':=D_H\Theta s'$, and $d(y,y')=\|y-y'\|$ is the Euclidean distance between y and y'.

Let us consider the N×(L+1) matrix V with entries $[V]_{n,l}=\exp(-j2\pi nl/N)$, and use it to perform the N-point discrete Fourier transform Vh of h. Note that $D_H=\mathrm{diag}(Vh)$; i.e., the diagonal entries of $D_H$ are those in vector Vh. Using the definitions $e:=s-s'\epsilon\delta|_e$, $u_e:=\Theta e$, and $D_e:=\mathrm{diag}(u_e)$, we can write $y-y'=D_Hu_e=\mathrm{diag}(Vh)u_e$. Furthermore, we can express the squared Euclidean distance $d^2(y,y')=\|D_Hu_e\|^2=\|D_eVh\|^2$ as $$d^2(y,y')=h^HV^HD_e^HD_eVh:=h^HA_eh. \tag{7}$$

An upper bound to the average PEP can be obtained by averaging (6) with respect to the random channel h to obtain (*V. Tarokh, N. Seshadri, and A. R. Calderbank, "Space-time codes for high data rate wireless communication: Performance criterion and code construction," IEEE Transactions*

*on Information Theory, vol. 44, no. 2, pp. 744-765, March 1998, herein incorporated by reference*):

$$P(s \to s') \le \prod_{l=0}^{L} \frac{1}{1+\alpha_L \lambda_{e,l}/(4N_0)}, \tag{8}$$

where $\lambda_{e,0}, \lambda_{e,1}, \ldots, \lambda_{e,L}$ are the non-increasing eigen-values of the matrix $A_e = V^H D_e^H D_e V$.

If $r_e$ is the rank of $A_e$, then $\lambda_{e,1} \neq 0$ if and only if $l \in [0, r_e - 1]$. Since $1+\alpha_L \lambda_{e,1}/(4N_0) > \lambda_{e,1}/(4N_0)$, it follows from (8) that $$P(s \to s') \le \left(\frac{1}{4N_0}\right)^{-r_e} \left(\prod_{l=0}^{r_e-1} \alpha_L \lambda_{e,l}\right)^{-1}. \tag{9}$$

We call $r_e$ the diversity order, denoted as $G_{d,e}$, and $(\Pi_{l=0}^{r_e 3 1 1} \alpha_L \lambda_{e,1})^{1/r_e}$ the coding advantage, denoted as $G_{c,e}$, for the symbol error vector e (*V. Tarokh, N. Seshadri, and A. R. Calderbank, "Space-time codes for high data rate wireless communication: Performance criterion and code construction," IEEE Transactions on Information Theory, vol. 44, no. 2, pp. 744-765, March 1998, herein incorporated by reference*). The diversity order $G_{d,e}$ determines the slope of the averaged (w.r.t. the random channel) PEP (between s and s') as a function of the SNR at high SNR ($N_0 \to 0$). Correspondingly, $G_{c,e}$ determines the shift of this PEP curve in SNR relative to a benchmark error rate curve of $(1/4N_0)^{-r_e}$. When $r_e = L+1$, $A_e$ is full rank, the product of eigen-values becomes the determinant of $A_e$ and therefore the coding advantage is given by $\alpha_L [\det(A_e)]^{1/(L+1)}$.

Since both $G_{d,e}$ and $G_{d,c}$ depend on the choice of e, we define the diversity order and coding advantages for our LE-OFDM system, respectively, as:

$$G_d := \min_{e \in S_e} G_{d,e} = \min_{e \in S_e} \operatorname{rank}(A_e), \text{ and } G_c = \min_{e \in S_e} G_{c,e}. \tag{10}$$

We refer to diversity order herein to mean the asymptotic slope of the error probability versus SNR curve in a log-log scale. Often, "diversity" refers to "channel diversity," i.e., roughly the degree of freedom of a given channel. To attain a certain diversity order (slope) on the error probability versus SNR curve, three conditions may be satisfied: i) Transmitter 4 is well-designed so that the information symbols are encoded with sufficient redundancy (enough diversification); ii) Channel 8 is capable of providing enough degrees of freedom; iii) Receiver 4 is well designed so as to sufficiently exploit the redundancy introduced at the transmitter.

Since the diversity order $G_d$ determines how fast the symbol error probability drops as SNR increases, $G_d$ is to be optimized first.

We have the following theorem.

Theorem 1 (Maximum Achievable Diversity Order): For a transmitted codeword set $\mathfrak{U}$ with minimum Hamming distance $\delta_{min}$, over i.i.d. FIR Rayleigh fading channels of order L, the diversity order is $\min(\delta_{min}, L+1)$. Thus, the Maximum Achievable Diversity Order (MADO) of LE-OFDM transmissions is L+1 and in order to achieve MADO, we need $\delta_{min} \ge L+1$.

Proof: Since matrix $A_e = V^H D_e^H D_e V$ in (7) is the Gram matrix[1] of $D_e V$, the rank $r_e$ of $A_e$ is the same as the rank of $D_e V$, which is $\min(\delta(u, u'), L+1) \le L+1$. Therefore, the diversity order of the system is $$G_d = \min_{e \in S_e} \operatorname{rank}(A_e) = \min_{e \in S_e} \min[\delta(u, u'), L+1] = \min(\delta_{min}, L+1) \le L+1,$$

and the equality is achieved when $\delta_{min} \ge L+1$.

Theorem 1 is intuitively reasonable because the FIR Rayleigh fading [channel offers us L+1 independent fading] *[S. G. Wilson, Digital Modulation and Coding, Prentice-Hall, Inc, 1996, herein incorporated by reference]* taps, which is the maximum possible number of independent replicas of the transmitted signal in the serial transmission mode. In order to achieve the MADO, any two codewords in $\mathfrak{U}$ should be different by no less than L+1 entries.

The results in Theorem 1 can also be applied to GF-coded/interleaved OFDM systems provided that channel coding or interleaving is applied only within an OFDM symbol and not across successive OFDM symbols. The diversity is again the minimum of the minimum Hamming distance of the code and L+1. To see this, it suffices to view $\mathfrak{U}$ as the codeword set of GF-coded blocks.

To achieve MADO, we need $A_e$ to be full rank and thus positive definite for any $e \in \delta_e$. This is true if and only if $h^H A_e h > 0$ for any $h \neq 0 \in C^{L+1}$. Equation (7) shows that this is equivalent to $d^2(y, y') = \|D_H \Theta e\|^2 \neq 0$, $\forall e \in \delta_e$, and $\forall h \neq 0$. The latter means that any two different transmitted vectors should result in different received vectors in the absence of noise, irrespective of the channel; in such cases, we call the symbols detectable or recoverable. The conditions for achieving MADO and channel-irrespective symbol detectability are summarized in the following theorem:

Theorem 2 (Symbol Detectability ⇔ MADO): Under the channel conditions of Theorem 1, the maximum diversity order is achieved if and only if symbol detectability is achieved; i.e., $\|D_H \Theta c\|^2 \neq 0$, $\forall e \in \delta_e$ and $\forall h \neq 0$.

The result in Theorem 2 is somewhat surprising: it asserts the equivalence of a deterministic property of the code, namely symbol detectability in the absence of noise, with a statistical property, the diversity order. It can be explained though, by realizing that in random channels, the performance is mostly affected by the worst channels, despite their small realization probability. By guaranteeing detectability for any, and therefore the worst, channels, we are essentially improving the ensemble performance.

The symbol detectability condition in Theorem 2 should be checked against all pairs s and s', which is usually not an easy task, especially when the underlying constellations are large and/or when the size K of s is large. But it is possible to identify sufficient conditions on $\Theta$ that guarantee symbol detectability and that are relatively easy to check. One such condition is provided by the following theorem.

Theorem 3 (Sufficient Condition for MADO): For i.i.d. FIR Rayleigh fading channels of order L, MADO is achieved when $\operatorname{rank}(D_H \Theta) = K$, $\forall h \neq 0$, which is equivalent to the following condition: Any N−L rows of $\Theta$ span the $C^{1 \times K}$ space. The latter in turn implies that $N-L \ge K$.

Proof: First of all, since $\Theta$ is of size N×K, it can not have rank greater than K. If MADO is not achieved, there exists at least one channel h and $e \in \delta_e$ such that $D_H \Theta e = 0$ by Theorem 2, which means that $\operatorname{rank}(D_H \Theta) < K$. So, MADO is achieved when $D_H \Theta = K$. Secondly, since the diagonal entries of $D_H$ represent frequency response of the channel h evaluated at the FFT frequencies, there can be at most L zeros on the diagonal of $D_H$. In order that $\operatorname{rank}(D_H \Theta) = K$, $\forall h$, it suffices to have any N−L rows of $\Theta$ span the $C^{1 \times K}$ space. On the other hand, when there is a set of N−L rows of $\Theta$ that are linearly dependent, we can find a channel that has zeros at frequencies corresponding to the remaining L rows. Such a channel will make rank $(D_H\Theta)<K$. This completes the proof.

The natural question that arises at this point is whether there exist LE matrices $\Theta$ that satisfy the conditions of Theorem 3. The following theorem constructively shows two classes of encoders that satisfy Theorem 3 and thus achieve MADO.

Theorem 4 (MADO-achieving encoders):

i) Vandermonde Encoders: Choose N points $\rho_n \in C$, n=0, 1, . . . , N−1, such that $\rho_m \neq \rho_n$, $\forall n \neq n$. Let $\rho := [\rho_0, \rho_1, \ldots, \rho_{N-1}]^T$. Then the Vandermonde encoder $\Theta(\rho) \in C^{N \times K}$ defined by $[\Theta(\rho)]_{n,k} = \rho_n^{\,k}$ satisfies Theorem 3 and thus achieves MADO.

ii) Cosine Encoders: Choose N points $\phi_0, \phi_1, \ldots, \phi_{N-1} \in R$, such that $\phi_m \neq (2k+1)\pi$ and $\phi_m \pm \phi_n \neq 2k\pi$, $\forall m \neq n$, $\forall k \in Z$. Let $\phi := [\phi_0, \phi_1, \ldots, \phi_{N-1}]^T$. Then the real cosine encoder $\Theta(\phi) \in R^{N \times K}$ defined by $$[\Theta(\phi)]_{n,k} = \cos\left(k + \frac{1}{2}\right)\phi_n$$

satisfies Theorem 3 and thus achieves MADO.

Proof: We first prove that Vandermonde encoders in i) satisfy the conditions of Theorem 3. Any K rows of the matrix $\Theta(\rho)$ form a square Vandermonde matrix with distinct rows. Such a Vandermonde matrix is known to have a determinant different from 0. Therefore, any K rows of $\Theta(\rho)$ are linearly independent, which satisfies the conditions in Theorem 3.

To prove Part ii) of the theorem, we show that any K rows of the encoding matrix form a non-singular square matrix. Without loss of generality, we consider the matrix formed by the first K rows:

$$\Theta_1 := \begin{bmatrix} \cos\left(\frac{1}{2}\phi_0\right) & \cos\left(\frac{3}{2}\phi_0\right) & \cdots & \cos\left(\frac{2K-1}{2}\phi_0\right) \\ \cos\left(\frac{1}{2}\phi_1\right) & \cos\left(\frac{3}{2}\phi_1\right) & \cdots & \cos\left(\frac{2K-1}{2}\phi_1\right) \\ \vdots & \vdots & \vdots & \vdots \\ \cos\left(\frac{1}{2}\phi_{K-1}\right) & \cos\left(\frac{3}{2}\phi_{K-1}\right) & \cdots & \cos\left(\frac{2K-1}{2}\phi_{K-1}\right) \end{bmatrix} \tag{11}$$

Let us evaluate the determinant $\det(\Theta_1)$. Define $$z_n := \cos\left(\frac{1}{2}\phi_n\right).$$

Using Chebyshev polynomials of the first kind $$T_l(x) := \cos(l\cos^{-1}x) = \sum_{i=0}^{[l/2]} \binom{l}{2i} x^{l-2i}(x^2-1)^i,$$

each entry $$\cos\left(\frac{2m+1}{2}\phi_n\right)$$

of $\Theta_1$ is a polynomial $T_{2m+1}(z_n)$ of order 2m+1 of some $$z_n = \cos\left(\frac{1}{2}\phi_n\right).$$

The determinant $\det(\Theta_1)$ is therefore a polynomial in $z_0, \ldots, z_{K-1}$ of order $\Sigma_{n=1}^{K}(2n-1)=K^2$. It is easy to see that when $z_n=0$, or when $z_m=\pm z_n$, $m \neq n$, $\Theta_1$ has an all-zero row, or, two rows that are either the same or the negative of each other. Therefore, $z_n$, $z_m-z_n$, and $z_m+z_n$ are all factors of $\det(\Theta_1)$. So, $g(z_0, z_1, \ldots, z_{K-1}) := \Pi_n z_n \Pi_{m>n}(z_m^2 - z_n^2)$ is also a factor of $\det(\Theta_1)$. But $g(z_0, z_1, \ldots, z_{K-1})$ is of order $K+K(K-1)=K^2$, which means that it is different from $\det(\Theta_1)$ by at most a constant. Using the leading coefficient[4] $2^{l-1}$ of $T_l(x)$, we obtain the constant as $\Pi_{n=1}^{K} 2^{2n-l-1} = 2^{K(K-1)}$; that is, $\det(\Theta_1) = 2^{K(K-1)} g(z_0, z_1, \ldots, z_{K-1})$.

Since $\phi_m \neq (2k+1)\pi$ and $\phi_m \pm \phi_n \neq 2k\pi$, $\forall m \neq n$, $\forall k \in Z$, none of $z_n$, $z_m-z_n$, and $z_m+z_n$ can be zero. Therefore, $\det(\Theta_1) \neq 0$ and $\Theta_1$ is non-singular. A similar argument can be applied to any K rows of the matrix, and the proof is complete.

Notice that up to now we have been assuming that the channel consists of i.i.d. zero-mean complex Gaussian taps. Such a model is well suited for studying average system performance in wireless fading channels, but is rather restrictive since the taps may be correlated. For correlated channels, we have the following result.

Theorem 5 (MADO of Correlated Rayleigh Channels): Let the channel h be zero-mean complex Gaussian with correlation matrix $R_h$. The maximum achievable diversity order equals the rank of $R_h$, which is achieved by any encoder that achieves MADO with i.i.d. Rayleigh channels. If $R_h$ is full rank and MADO is achieved, then the coding advantage is different from the coding advantage in the i.i.d. case only by a constant $$\det^{\frac{1}{L+1}}(R_h) \big/ \alpha_L.$$

Proof: Let $r_h := \mathrm{rank}(R_h)$ and the eigen-value decomposition of $R_h$ be $$R_h = [U_1 \;\; U_2] \begin{bmatrix} \Lambda_1 & 0 \\ 0 & \Lambda_2 \end{bmatrix} \begin{bmatrix} U_1^H \\ U_2^H \end{bmatrix}. \tag{12}$$

where $U_1$ is $(L+1)\times r_h$, $U_2$ is $(L+1)\times(L+1-r_h)$, $A_1$ is $r_h \times r_h$ full rank diagonal, and $A_2$ is an $(L+1-r_h)\times(L+1-r_h)$ all-zero matrix. Define $$\tilde{h}_1 := \Lambda_1^{-\frac{1}{2}} U_1^H h, \; \tilde{h}_2 := U_2^H,$$

and $\tilde{h} := [\tilde{h}_1^{\,T} \tilde{h}_2^{\,T}]^T$, where $$\Lambda_1^{-\frac{1}{2}}$$

is defined by $$\Lambda_1^{-\frac{1}{2}}\Lambda_1^{-\frac{1}{2}} = \Lambda_1^{-1}.$$

Since $h_2$ has an autocorrelation matrix $R_{\tilde{h}_2}=U_2^H R_h U_2=A_2$, all the entries of $\tilde{h}_2$ are zero almost surely. We can therefore write $$h = [U_1\Lambda_1^{\frac{1}{2}}\ U_2]\tilde{h} = U_1\Lambda_1^{\frac{1}{2}}h_1. \tag{13}$$

Since $$R_{\tilde{h}_1} = \Lambda_1^{-\frac{1}{2}}U_1^h R_h U_1 \Lambda_1^{-\frac{1}{2}} = I_{r_h}.$$

the entries of $\tilde{h}_1$, which are jointly Gaussian, are i.i.d.

Substituting (13) in (7), we obtain $$d^2(y, y') = h^H A_e h = \tilde{h}_1^H \Lambda_1^{\frac{1}{2}} U_1^H A_e U_1 \Lambda_1^{\frac{1}{2}} \tilde{h}_1 := \tilde{h}_1^H \tilde{A}_e \tilde{h}_1, \tag{14}$$

where $$\tilde{A}_e = \Lambda_1^{\frac{1}{2}} U_1^H A_e U_1 \Lambda_1^{\frac{1}{2}}$$

is an $r_h \times r_h$ matrix.

Following the same derivation as in (7)-(10), with $A_e$ replaced by $\tilde{A}_e$ and h replaced by $\tilde{h}_1$, we can obtain the diversity order and coding advantage for error event e as $$G_{d,e} = \mathrm{rank}(\tilde{A}_e) := \tilde{r}_e \le r_h \text{ and } G_{c,e} = \left(\prod_{l=0}^{\tilde{r}_e-1} \tilde{\lambda}_{e,l}\right)^{1/\tilde{r}_e}, \tag{15}$$

where $\tilde{\lambda}_{e,l}$, $l=1, \ldots, r_h$, are the eigen-values of $\tilde{A}_e$.

Where $\Theta$ is designed such that MADO is achieved with i.i.d. channels, $A_e$ is full rank for any $e \epsilon \delta_e$. Then $A_e$ is positive definite Hermitian symmetric, which means that there exists an $(L+1)\times(L+1)$ matrix $B_e$ such that $A_e=B_e^H B_e$. It follows that $$\tilde{A}_e = \Lambda_1^{\frac{1}{2}} U_1^H B_e^H B_e U_1 \Lambda_1^{\frac{1}{2}}$$

is the Gram matrix of $$B_e U_1 \Lambda_1^{\frac{1}{2}},$$

and thus $A_e$ has rank equal to $$\mathrm{rank}\left(B_e U_1 \Lambda_1^{\frac{1}{2}}\right) = \mathrm{rank}\left(U_1 \Lambda_1^{\frac{1}{2}}\right) = r_h,$$

the MADO for this correlated channel.

When the MADO $r_h$ is achieved, the coding advantage in (15) for e becomes $G_{c,e}=\det(\tilde{A}_e)^{1/r_h}$. If in addition, $R_h$ has full rank $r_h=L+1$, then $\det(\tilde{A}_e)^{1/r_k}=\det(A_e)^{1/(L+1)}\ \det(R_h)^{1/(L+1)}$, which means that in the full-rank correlated channel case, the full-diversity coding advantage is different from the coding advantage in the i.i.d. case only by a constant $\det(R_h)^{1/(L+1)}/\alpha_L$.

Theorem 5 asserts that the $\mathrm{rank}(R_h)$ is the MADO for LE-OFDM systems as well as for coded OFDM systems that do not code or interleave across OFDM symbols. Also, MADO-achieving transmissions through i.i.d. channels can achieve the MADO for correlated channels as well.

Coding advantage $G_c$ is another parameter that needs to be optimized among the MADO-achieving encoders. Since for MADO-achieving encoders, coding advantage is given by $G_c=\min_{e\neq 0} G_{c,e}=\alpha_L \min_{e\neq 0}\det(A_e)$, we need to maximize the minimum determinant of $A_e$ over all possible error sequences e, among the MADO-achieving encoders.

The following theorem asserts that ZP-only transmission is one of the coding advantage maximizers (*Z. Wang, X. Ma, and G. B. Giannakis, "OFDM or single-carrier zero-padded block transmissions?" IEEE Transactions on Communications, August 2001* (*accepted*), *herein incorporated by reference; "Optimality of Single-Carrier Zero-Padded Block Transmissions," in Proc. of Wireless Comm. and Networking Conf., pp. 660-664, 2002, Orlando, Fla., herein incorporated by reference*).

Theorem 6 (ZP-only: maximum coding advantage): Suppose the entries of s(i) are drawn independently from a finite constellation _4 with minimum distance of $d_{min}$(_4 ). Then the maximum coding advantage of an LE-OFDM for i.i.d. Rayleigh fading channels under as1) is $G_{c,max}-\alpha_L d_{min}^2$(_4 ). The maximum coding advantage is achieved by ZP-only transmissions with any K.

In order to achieve high rate, we have adopted K=N−L and found two special classes of encoders that can achieve MADO in Theorem 4. The Vandermonde encoders are reminiscent of the parity check matrix of BCH codes, Reed-Solomon (RS) codes, and Goppa codes (*V. D. Goppa, Geometry and Codes, Kluwer Academic Publishers, 1988, herein incorporated by reference*). It turns out that the MADO-achieving encoders and these codes are closely related.

Let us now take $\delta=C^{K\times 1}$. We call the codeword set $\mathfrak{C}$ that is generated by $\Theta$ of size N×K Maximum Distance Separable (MDS) if $\delta_{min}(\mathfrak{C})$=N−K+1. The fact that N−K+1 is the maximum possible minimum Hamming distance of $\mathfrak{C}$ is due to the Singleton bound *R. C. Singleton, "Maximum distance q-nary codes," IEEE Transactions on Information Theory, vol. 10, pp. 116-118, 1960, herein incorporated by reference*). Although the Singleton bound was originally proposed and mostly known for Galois field codes, its proof can be easily generalized to real/complex field as well (*R. Knopp and P. A. Humblet, "On coding for block fading channels," IEEE Transactions on Information Theory, vol. 46, no. 1, pp. 189-205, January 2000, herein incorporated by reference*). In our case, it asserts that $\delta_{min}\le$N−K+1 when $\delta=C^{K\times 1}$.

Notice that the assumption $\delta=C^{K\times T}$ is usually not true in practice, because the entries of s are usually chosen from a finite-alphabet set, e.g., QPSK or QAM. But such an assumption greatly simplifies the system design task: once we can guarantee $\delta_{min}$=N−K+1 for $\delta=C^{K\times 1}$, we can choose any constellation from other considerations without worrying about the diversity performance. However, for a finite constellation, i.e., when $\delta$ has finite cardinality, the result on $\delta_{min}$ can be improved. In fact, it can be shown that even with a square and unitary K×K matrix $\Theta$, it is possible to have $\delta_{min}$=K (*Y. Xin, Z. Wang, and G. B. Giannakis, "Space-time diversity systems*

*based on unitary constellation-rotating precoders," in Proc. of Intl. Conf. on ASSP, Salt Lake City, Utah, May 7-11, 2001, vol. 4, pp. 2429-2432, herein incorporated by reference*).

To satisfy the condition in Theorem 2 with the highest rate for a given N, we need K=N−L, and $\delta_{min}$=L+1=N−K+1. In other words, to achieve constellation-irrespective full-diversity with highest rate, we need the code to be MDS. According to our Theorem 4, such MDS encoders always exist for any N and K<N.

In the GF, there also exist MDS codes (*F. J. MacWilliams and N. J. A. Sloane, The Theory of Error-Correcting Codes, Amsterdam: North Holland, 1977, herein incorporated by reference*). Examples of GF MDS codes include single-parity-check coding, repetition coding, generalized RS coding, extended RS coding, doubly extended RS coding, algebraic-geometry codes constructed using an elliptic curve.

When a GF MDS code exists, we may use it to replace our CF linear code, and achieve the same (maximum) diversity order at the same rate. But such GF codes do not always exist for a given field and N, K. For $F_2$, only trivial MDS codes exist (*F. J. MacWilliams and N. J. A. Sloane, The Theory of Error-Correcting Codes, Amsterdam: North-Holland, 1977, herein incorporated by reference*). This means that it is impossible to construct, for example, binary (and thus simply decodeable) MDS codes that have $\delta_{min}\geq 2$, except for the repetition code. One other restriction of the GF MDS code is on the input and output alphabet. Although Reed-Solomon codes are the least restrictive among them in terms of the number of elements in the field, they are constrained on the code length and the alphabet size. Our linear encoders Θ, on the other hand, operate over the complex field with no restriction on the input symbol alphabet or the coded symbol alphabet.

We obtain analogous results on our complex field MDS codes for achieving MADO to known results for GF MDS codes (*F. J. MacWilliams and N. J. A. Sloane, The Theory of Error-Correcting Codes, Amsterdam: North-Holland, 1977, herein incorporated by reference*).

Theorem 7 (Dual MDS code): For an MDS code generated by $\Theta\epsilon C^{N\times K}$, the code generated by the matrix $\Theta_1$ is also MDS, where $\Theta_\perp$ is an N×(N−K) matrix such that $\Theta_\perp{}^T\Theta=0$.

A generator Θ for an MDS code is called systematic if it is in the form $[I_K, P]^T$ where P is a K×(N−K) matrix.

Theorem 8 (Systematic MDS code): A code generated by $[I, P]^T$ is MDS if and only if every square submatrix of P is nonsingular.

To construct systematic MDS codes using Theorem 8, the following two results can be useful (*F. J. MacWilliams and N. J. A. Sloane, The Theory of Error-Correcting Codes, Amsterdam: North-Holland, 1977, p. 323, herein incorporated by reference*):

i) Every square submatrix of a Vandermonde matrix with real, positive entries is nonsingular.

ii) A K×(N−K) matrix P is called a Cauchy matrix if its (i, j)th element $[P]_{ij}=1/(x_i+y_i)$ for some elements $x_1, x_2, \ldots, x_K$, $y_1, y_2, \ldots, y_{N-K}$, such that the $x_i$'s are distinct, the $y_j$'s are distinct, and $x_i+y_j\neq 0$ for all i, j. Any square submatrix of a Cauchy matrix is nonsingular (*R. M. Roth and G. Seroussi, "On generator matrices of MDS codes," IEEE Transactions on Information Theory, vol. 31, no. 6, pp. 826-830, November 1985, herein incorporated by reference*).

Next, we discuss decoding options for our CF code. For this purpose, we restrict our attention to the case that δ is a finite set, e.g., a finite constellation carved from (possibly sealed and shifted) $Z^K$. This includes BPSK, QPSK, and QAM *[X. Giraud, E. Boutillon, and J. C. Belfiore, "Algebraic tools to build modulation schemes for fading channels," IEEE Transactions on Information Theory, vol. 43, pp. 938-952, May 1997, herein incorporated by reference; Z. Liu; Y. Xin, and G. B. Giannakis, "Unitary precoded OFDM with maximum multipath diversity and coding gains," in Proc. of the Asilomar Conf., Pacific Grove, Calif., November 2001, herein incorporated by reference; and Y. Xin, Z. Wang, and G. B. Giannakis, "Space-time constellation-rotating codes maximizing diversity and coding gains," in Proc. of GLOBECOM, San Antonio, Tex., November 2001, pp. 455-459, herein incorporated by reference]* as special cases. Since the task of the receiver involves both channel equalization and decoding of the CF linear code, we will consider the combined task jointly and will use the words decoding, detection, and equalization interchangeably.

Maximum Likelihood Detection

To achieve MADO, LE-OFDM requires ML decoding. For the input output relationship in (2) and under the AWGN assumption, the minimum-distance detection rule becomes ML and can be formulated as follows:

$$\hat{s} = \underset{s\in\S}{\operatorname{argmin}}\|x - D_H\Theta s\|. \tag{16}$$

ML decoding of LE transmissions belongs to a general class of lattice decoding problems, as the matrix product $D_H\Theta$ in (2) gives rise to a discrete subgroup (lattice) of the $C^N$ space under the vector addition operation. In its most general form, finding the optimum estimate in (16) requires searching over |δ| vectors. For large block sizes and/or large constellations, it is practically impossible to perform exhaustive search since the complexity depends exponentially on the number of symbols in the block.

Figure 5:
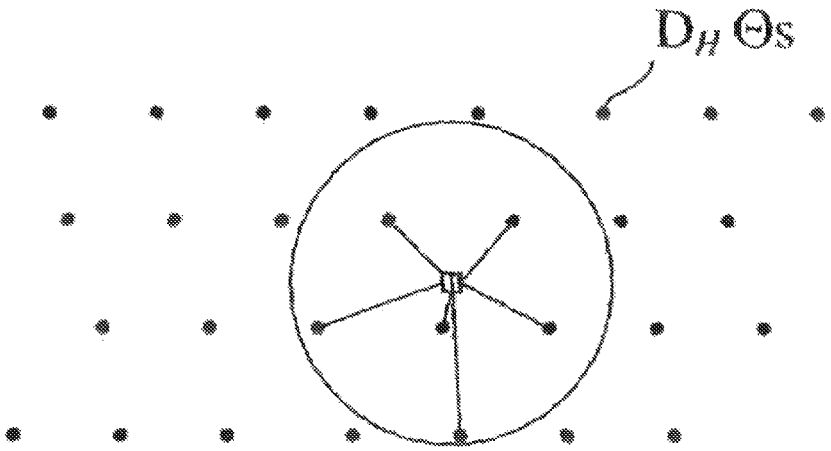
FIG. 5 illustrates sphere decoding applied in one embodiment of the receiver of FIG. 1.

A relatively less complex ML search is possible with the sphere decoding (SD) algorithm (c.f., FIG. 5), which only searches coded vectors that are within a sphere centered at the received symbol x (c.f., (2)) (*E. Viterbo and J. Boutros, "A universal lattice code decoder for fading channels," IEEE Transactions on Information Theory, vol. 45, no. 5, pp. 1639-1642, 1999, herein incorporated by reference*). Denote the QR decomposition of $D_H\Theta$ as $D_H\Theta$=QR, where Q has size N×K and satisfies $Q^HQ=I_{K\times K}$, and R is an upper triangular K×K matrix. The problem in (16) then converts to the following equivalent problem $$\hat{s} = \underset{s\in\S}{\operatorname{argmin}}\|Q^H x - Rs\|, \tag{17}$$

SD starts its search by looking only at vectors s such that $$\|Q^H x - Rs\| < C, \tag{18}$$

where C is the search radius, a decoding parameter. Since R is upper triangular, in order to satisfy the inequality in (18), the last entry of s must satisfy $|[R]_{K,K}[s]_K|<C$, which reduces the search space if C is small. For one possible value of the last entry, possible candidates of the last-but-one entry are found and one candidate is taken. The process continues until a vector of $s_0$ is found that satisfies (18). Then the search radius C is set equal to $\|Q^H x - Rs_0\|$ and a new search round is started. If no other vector is found inside the radius, then $s_0$ is the ML solution. Otherwise, if $s_1$ is found inside the sphere, the search radius is again reduced to $\|Q^H x - Rs_1\|$, and so on. If no $s_0$ is ever found inside the initial sphere of radius C, then C is too small. In this case, either a decoding failure is declared or C is increased.

The complexity of the SD is polynomial in K (*U. Fincke and M. Pohst, "Improved methods for calculating vectors of short length in a lattice, including a complexity analysis," Math. Comput., vol. 44, pp. 463-471, April 1985, herein incorporated by reference*), which is better than exponential but still too high for practical purposes. Indeed, it is not suitable for codes of block size greater than, say, 16. When the block size is small, the sphere decoder can be considered as an option to achieve the ML performance at manageable complexity.

In the special case of ZP-only transmissions, the received vector is given by $\tilde{x}=Hs+\tilde{n}$. Thanks to the zero-padding, the full convolution of the transmitted block s with the FIR channel is preserved and the channel is represented as the banded Toeplitz matrix H. In such a case, Viterbi decoding can be used at a complexity of $\mathcal{O}(Q^L)$ per symbol, where Q is the constellation size of the symbols in s (*G. D. Jr. Forney, "Maximum-likelihood sequence estimation of digital sequences in the presence of intersymbol interference," IEEE Transactions on Information Theory, vol. 18, pp. 363-378, May 1972, herein incorporated by reference*).

Low-Complexity Linear Detection

Zero-forcing (ZF) and MMSE detectors (equalizers) offer low-complexity alternatives. The ZF and MMSE equalizers based on the input-output relationship (2) can be written as (*A. Scaglione, G. B. Giannakis, and S. Barbarossa, "Linear precoding for estimation and equalization of frequency-selective channels," in Signal Processing Advances in Wireless and Mobile Communications, G. B. Giannakis, Y. Hua, P. Stoica, and L. Tong, Eds. 2001, vol. I, Chapter 9, Prentice-Hall, Inc., herein incorporated by reference*):

$$G^{zf}=(D_H\Theta)^T \text{ and } G^{mmse}=R_s\Theta^H D_H^H(\sigma_\eta^2 I_N+D_H\Theta R_s\Theta^H D_H^H)^{-1},$$

respectively, where $(\cdot)^T$ denotes pseudo-inverse, $\sigma_\eta^2$ is the variance of entries of noise $\eta$, and $R_s$ is the autocorrelation matrix of s. Given the ZF and MMSE equalizers, they each require $\mathcal{O}(N\times K)$ operations per K symbols. So per symbol, they require only $\mathcal{O}(N)$ operations. To obtain the ZF or MMSE equalizers, inversion of a N×N matrix is involved, which has complexity $\mathcal{O}(N^3)$. However, the equalizers only needs to be recomputed when the channel changes.

Decision-Directed Detection

The ML detection schemes in general have high complexity, while the linear detectors may have decreased performance. The class of decision-directed detectors lies between these categories, both in terms of complexity and in terms of performance.

Figure 6:
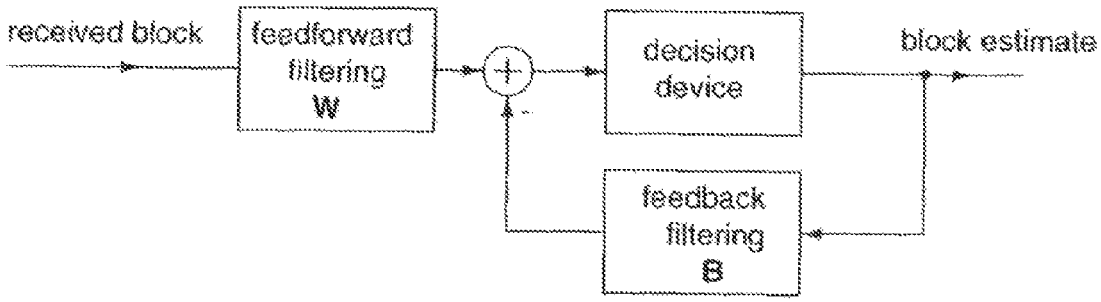
FIG. 6 illustrates an example portion of the receiver of FIG. 1.

Decision-directed detectors capitalize on the finite alphabet property that is almost always available in practice. In the equalization scenario, they are more commonly known as Decision Feedback Equalizers (DFE). In a single-user block formulation, the DFE has a structure as shown in FIG. 6, where the feed-forward filter is represented as a matrix W and the feedback filter is presented as B (*A. Stamoulis, G. B. Giannakis, and A. Scaglione, "Block FIR decision-feedback equalizers for filterbank precoded transmissions with blind channel estimation capabilities," IEEE Transactions on Communications, vol. 49, pp. 69-83, January 2001, herein incorporated by reference*). Since we can only feed back decisions in a casual fashion, B is usually chosen to be a strictly upper or lower triangular matrix with zero diagonal entries. Although the feedback loop is represented as a matrix, the operations happen in a serial fashion: the estimated symbols are fed back serially as their decisions are formed one by one. The matrices W and B can be designed according to ZF or MMSE criteria (*N. Al-Dhahir and A. H. Sayed, "The finite-length multi-input multi-output MMSE-DFE," IEEE Transactions on Signal Processing, vol. 48, no. 10, pp. 2921-2936, October 2000, herein incorporated by reference; A. Stamoulis, G. B. Giannakis, and A. Scaglione, "Block FIR decision-feedback equalizers for filterbank precoded transmissions with blind channel estimation capabilities," IEEE Transactions on Communications, vol. 49, pp. 69-83, January 2001, herein incorporated by reference*). When B is chosen to be triangular and the MSE between the block estimate before the decision device is minimized, the feed-forward and feedback filtering matrices can be found from the following equations (*N. Al-Dhahir and A. H. Sayed, "The finite-length multi-input multi-output MMSE-DFE," IEEE Transactions on Signal Processing, vol. 48, no. 10, pp. 2921-2936, October 2000, herein incorporated by reference; A. Stamoulis, G. B. Giannakis, and A. Scaglione, "Block FIR decision-feedback equalizers for filterbank precoded transmissions with blind channel estimation capabilities," IEEE Transactions on Communications, vol. 49, pp. 69-83, January 2001, herein incorporated by reference*):

$$R_s^{-1}+\Theta^H D_H^H R_\eta^{-1} D_H\Theta=U^H\Lambda U, \tag{19}$$

$$W=UR_s\Theta^H D_H^H(R_\eta+D_H\Theta R_s\Theta^H D_H^H)^{-1},\ B=U-I, \tag{20}$$

where the R's denote autocorrelation matrices, (19) was obtained using Cholesky decomposition, and U is an upper triangular matrix with unit diagonal entries. Since the feed-forward and feedback filtering entails only matrix-vector multiplications, the complexity of such decision directed schemes is comparable to that of linear detectors. Because decision directed schemes capitalize on the finite-alphabet property of the information symbols, the performance is usually (much) better than linear detectors.

As an example, we list in the following table the approximate number of flops needed for different decoding schemes when K=14, L=2, N=16, and BPSK modulation is deployed; i.e., $\delta=\{\pm 1\}^K$.

TABLE 1

| Decoding Scheme | order of Flops/symbol |
|---|---|
| Exhaustive ML | $>2^K=2^{14}=16.384$ |
| Sphere Decoding | ≈800 (empirical) |
| ZF/MMSE | ≈N = 16 |
| Decision-Directed | ≈N = 16 |
| Viterbi for ZP-only | $2^L=2^2=4$ |

Iterative Detectors

Other possible decoding methods include iterative detectors, such as successive interference cancellation with iterative least squares (SIC-ILS) (*T. Li and N. D. Sidiropoulos, "Blind digital signal separation using successive interference cancellation iterative least squares," IEEE Transactions on Signal Processing, vol. 48, no. 11, pp. 3146-3152, November 2000, herein incorporated by reference*), and multistage cancellations (*S. Verdú, Multiuser Detection, Cambridge Press, 1998, herein incorporated by reference*). These methods are similar to the illustrated DFE in the interference from symbols that are decided in a block is canceled before a decision on the current symbol is made. In SIC-ILS, least squares is used as the optimization criterion and at each step or iteration, the cost function (least-squares) will decrease or remain the same. In multistage cancellation, the MMSE criterion is often used such that MF is optimum after the interference is removed (supposing that the noise is white). The difference between a multistage cancellation scheme and the block DFE is that the DFE symbol decisions are made serially; and for each undecided symbol, only interference from symbols that have been decided is cancelled; while in multistage cancellation, all symbols are decided simultaneously and then their mutual interferences are removed in a parallel fashion.

Figure 7:
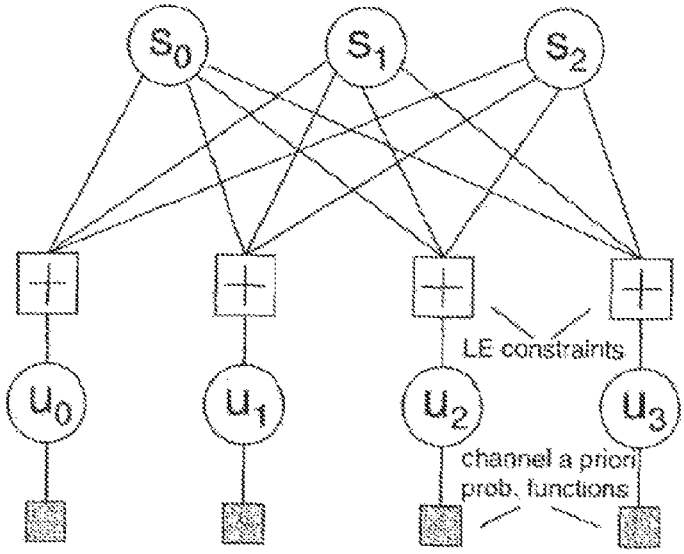
FIG. 7 is factor graph representing an example linear encoding process.

As illustrated in FIG. 7, another embodiment may utilize for LEOFDM equalization an iterative "sum-product" decoding algorithm, which is also used in Turbo decoding (*F. R. Kschischang, B. J. Frey, and H-A. Loeliger, "Factor graphs and the sum-product algorithm," IEEE Transactions on Information Theory, vol. 47, no. 2, pp. 498-519, February 2001, herein incorporated by reference*). In particular, the coded system is represented using a factor graph, which describes the interdependence of the encoder input, the encode output, and the noise-corrupted coded symbols.

As a simple example, suppose the encoder takes a block of 3 symbols $s:=[s_0, s_1, s_2]^T$ as input and linearly encodes them by a 4×3 matrix Θ to produce the coded symbols $u:=[u_0, u_1, u_2, u_3]$. After passing through the channel (OFDM modulation/demodulation), we obtain the channel output $x_i=H(e^{j2\pi i/4})u_i$, i=0, 1, 2, 3. The factor graph for such a coded system is shown in FIG. 7, where the LE is represented by linear constraints between the LE input symbols s and the LE output symbols u.

Parallel Encoding for Low Complexity Decoding

When the number of carriers N is very large (e.g., 1,024), it is desirable to keep the decoding complexity manageable. To achieve this we can split the encoder into several smaller encoders. Specifically, we can choose $\Theta=P\Theta'$, where P is a permutation matrix that interleaves the subcarriers, and Θ' is a block diagonal matrix: $\Theta'=\mathrm{diag}(\Theta_0, \Theta_1, \ldots, \Theta_{M-1})$. This is a essentially a form of coding for interleaved OFDM, except that the coding is done in complex domain here. The matrices $\Theta_m$, m=0, . . . , M−1 are of smaller size than Θ and all of them can even be chosen to be identical. With such designed Θ, decoding s from the noisy $D_H\Theta s$ is equivalent to decoding M coded sub-vectors of smaller sizes and therefore the overall decoding complexity can be reduced considerably. Such a decomposition is particularly important when a high complexity decoder such as the sphere decoder is to be deployed.

The price paid for low decoding complexity is a decrease in transmission rate. When such parallel encoding is used, we should make sure that each of the $\Theta_m$ matrices can guarantee full diversity, which requires $\Theta_m$ to have L redundant rows. The overall Θ will then have ML redundant rows, which corresponds to an M-fold increase of the redundancy of a full single encoder of size N×K. If a fixed constellation is used for entries in s, then square $\Theta_m$'s can be used, which does not lead to loss of efficiency (*Z. Liu, Y. Xin, and G. B. Giannakis, "Linear Constellation Precoding for OFDM with Maximum Multipath Diversity and Coding Gains," Proceedings of 35th Asilomar Conference on Signals, Systems & Computers, Pacific Grove, Calif., Nov. 4-7, 2001, pp. 1445-1449, herein incorporated by reference*).

Figure 8:
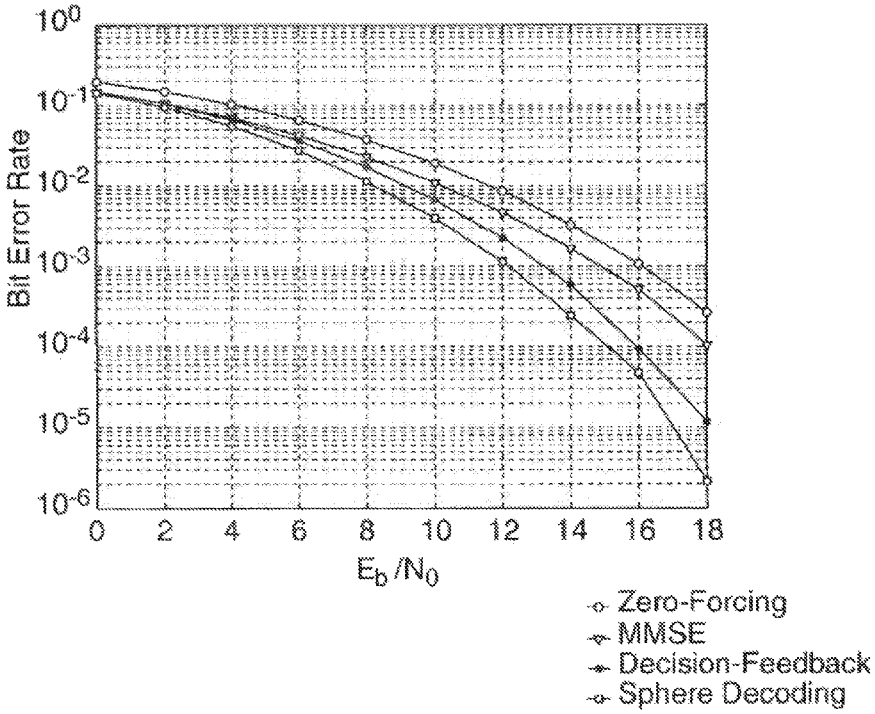
FIGS. 8-10 are graphs that illustrate exemplary results of simulations of the described techniques.
Figure 9:
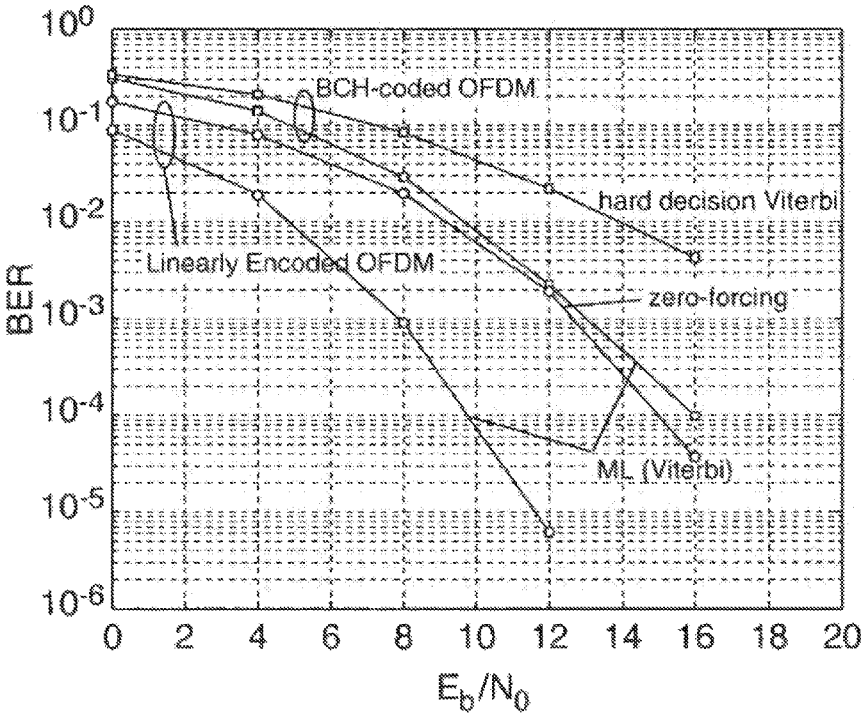
Figure 10:
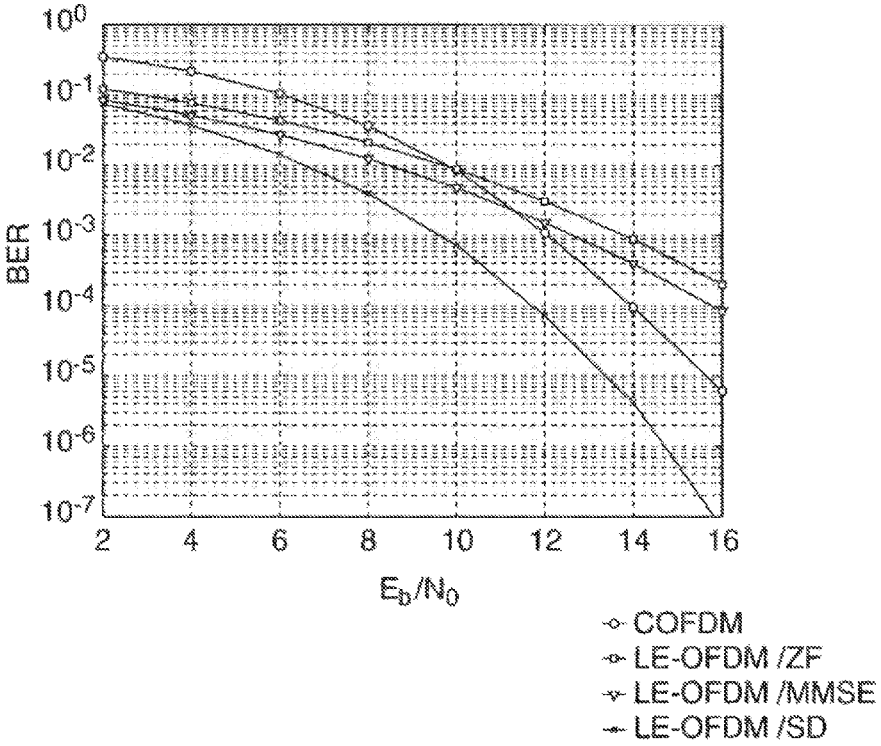

FIGS. 8-10 are graphs that illustrate exemplary results of simulations of the described techniques. In the illustrated results, we compare the proposed wireless communication techniques with existing coded OFDM systems that deploy existing GF block codes and convolutional codes. In all cases, BPSK constellation is used, and in Test Case 2 and 3, the binary encoded symbols are mapped to ±1's before OFDM modulation.

Test case 1 (Decoding of LE-OFDM): We first test the performance of different decoding algorithms. The LE-OFDM system has parameters K=14, N=16, L=2. The channel is i.i.d. Rayleigh and BER's for 200 random channel realizations according to As1) are averaged. FIG. 8 shows the performance of ZF, MMSE, DFE, and sphere decoding (ML) for LE-OFDM. We notice that at BER of $10^{-4}$ DFE performs about 2 dB better than the MMSE detectors, while at the same time it is only less than 1 dB inferior to the sphere decoder, which virtually achieves the ML decoding performance. The complexity of ZF, MMSE, DFE is all about N=16 flops per symbol, which is much less than the sphere decoding algorithm, which empirically needs about 800 flops per symbol in this case.

Test case 2 (Comparing LE-OFDM with BCH-coded OFDM): For demonstration and verification purposes, we first compare LE-OFDM with coded OFDM that relies on GF block coding. The channel is modeled as FIR with 5 i.i.d. Rayleigh distributed taps. In FIG. 9, we illustrate Bit Error Rate (BER) performance of CF coded OFDM with Vandermonde code of Theorem 4, and that of binary BCH-coded OFDM. The system parameters are K=26, N=31. The generating polynomial of the BCH code is $g(D)=1+D^2+D^5$. Since we can view this BCH as a rate 1 convolutional code with the same generator and with termination after 26 information symbols (i.e., the code ends at the all-zero state), we can use the Viterbi algorithm *[J. Hagenauer, and P. Hoeher, "A Viterbi Algorithm with Soft-Decision Outputs and Its Applications," in Proc. Of the IEEE 1989 Global Communications Conference, Dallas, Tex., pp. 1680-1686, November 1989, herein incorporated by reference]* for soft-decision ML BCH decoding. For LE-OFDM, since the transmission is essentially a ZP-only single-carrier scheme, the Viterbi algorithm is also applicable for ML decoding.

Since the binary (26, 31) BCH code has minimum Hamming distance 3, it possesses a diversity order of 3, which is only half of the maximum possible (L+1=6) that LE-OFDM achieves with the same spectral efficiency. This explains the difference in their performance. We can see that when the optimum ML decoder is adopted by both receivers. LE-OFDM outperforms coded OFDM with BCH coding considerably. The slopes of the corresponding BER curves also confirm our theoretical results.

Test case 3 (Comparing LE-OFDM with convolutionally coded OFDM): In this test, we compare (see FIG. 10) our LE-OFDM system with convolutionally coded OFDM (with a rate ½ code punctured to rate ¾ followed by interleaving) that is deployed by the HiperLAN2 standard (*ETSI, "Broadband Radio Access Networks (BRAN), herein incorporated by reference; HIPERLAN Type 2 technical specification Part 1—physical layer," DTS/BRAN030003-1, October 1999, herein incorporated by reference*) over the channels used in Test Case 2. The rate ½ mother code has its generator in octal form as (133, 171) and there are 64 states in its trellis. Every 3rd bit from the first branch and every second bit from the second branch of the mother code are punctured to obtain the rate ¾ code, which results in a code whose weight enumerating function is $8W^5+31W^6+160W^7+\ldots$. So the free distance is 5, which means that the achieved diversity is 5, less than the diversity order 6 achieved by LE-OFDM.

The parameters are K=36, N=48. We use two parallel truncated DCT encoders; that is, $\Theta=I_{2\times2}\otimes\Theta_0$, where $\otimes$ denotes Kronecker product, and $\Theta_0$ is a 24×18 encoder obtained by taking the first 18 columns of a 24×24 DCT matrix. With ML decoding, LE-OFDM performs about 2 dB better than convolutionally coded OFDM. From the ML performance curves in FIG. 10, LE-OFDM seems to achieve a larger coding advantage than the punctured convolutional code we used.

Surprisingly, even with linear MMSE equalization, the performance of LE-OFDM is better than coded OFDM for SNR values less than 12 dB. The complexity of ML decoding for LE-OFDM is quite high in the order of 1,000 flops per symbol. But the ZF and MMSE decoders have comparable or even lower complexity than the Viterbi decoder for the convolutional code.

The complexity of LE-OFDM can be dramatically reduced using the parallel encoding method with square encoders (*Z. Liu, Y. Xin, and G. B. Giannakis, "Linear Constellation Precoding for OFDM with Maximum Multipath Diversity and Coding Gains," Proceedings of 35th Asilomar Conference on Signals, Systems & Computers, Pacific Grove, Calif., Nov. 4-7, 2001, pp. 1445-1449, herein incorporated by reference*). It is also possible to combine CF coding with conventional GF coding, in which case only small square encoders of size 2×2 or 4×4 are necessary to achieve near optimum performance (*Z. Wang, S. Zhou, and G. B. Giannakis, "Joint coded-precoded OFDM with low-complexity turbo-decoding," in Proc. of the European Wireless Conf., Florence, Italy, Feb. 25-28, 2002, pp. 648-654, herein incorporated by reference*).

Various embodiments of the invention have been described. The described techniques can be embodied in a variety of receivers and transmitters including base stations, cell phones, laptop computers, handheld computing devices, personal digital assistants (PDA's), and the like. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer readable instructions that when executed in a wireless communication device, cause the wireless communication device to carry out one or more of the techniques described herein. These and other embodiments are within the scope of the following claims.

The invention claimed is:

1. A wireless communication device comprising:

*a first encoder that encodes a data stream based on an error-control code to produce encoded symbols;*

*an interleaver that interleaves the encoded symbols to produce interleaved symbols;*

*a constellation mapper that maps the interleaved symbols to produce a stream of information bearing symbols selected from a constellation having a finite alphabet;*

[an] *a second* encoder that applies a linear transformation to [a] *the* stream of information bearing symbols selected from [a] *the* constellation having [a] *the* finite alphabet to produce a stream of precoded symbols that are complex numbers and *that* are not restricted by the constellation of the information bearing symbols; and a modulator to produce an output waveform in accordance with the stream of precoded symbols for transmission through a wireless channel.

2. The wireless communication device of claim 1, wherein the modulator generates the output waveform as a multicarrier waveform having a set of subcarriers, and the *second* encoder encodes the stream of information bearing symbols so that the subcarriers carry different linear combinations of the information symbols.

3. The wireless communication device of claim 1, wherein the *second* encoder applies the linear transformation by applying a unitary matrix to the information bearing symbols.

4. A wireless communication device comprising:

*a first encoder that encodes a data stream based on an error-control code to produce encoded symbols;*

*an interleaver that interleaves the encoded symbols to produce interleaved symbols;*

*a constellation mapper that maps the interleaved symbols to produce blocks of K information bearing symbols selected from a constellation having a finite alphabet;*

[an] *a second* encoder that applies a matrix to linearly transform *the* blocks of K information bearing symbols selected from [a] *the* constellation having [a] *the* finite alphabet to produce blocks of N precoded symbols that are complex numbers and *that* are not restricted to the constellation of the information bearing symbols; and a modulator that generates a multicarrier waveform having a set of subcarriers, where N is the number of subcarriers of the [multi-carrier] *multicarrier* waveform and K is less than or equal to N.

5. The wireless communication device of claim 4, wherein the [linear] *second* encoder has a code rate r=K/N.

6. The wireless communication device of claim 4, wherein the [linear] *second* encoder applies a matrix of size N×K to *the* blocks of K information bearing symbols to produce *the* blocks of N precoded symbols.

7. A wireless communication device, comprising:

an encoder that applies a matrix to linearly transform blocks of K information bearing symbols selected from a constellation having a finite alphabet to produce blocks of N precoded symbols that are complex numbers and *that* are not restricted by the constellation of the information bearing symbols; and a modulator that generates a multicarrier waveform having a set of subcarriers for transmission over a wireless channel, wherein N is the number of subcarriers and K is less than or equal to N, and wherein the size of the matrix is selected as a function of an order L of the wireless channel, and the number K of symbols per block is selected as a function of the channel order L.

8. The wireless communication device of claim 7, wherein K is selected so that K≥N−L.

9. The wireless communication device of claim 7, wherein K is selected so that K=N−L.

10. The wireless communication device of claim [6] *7*, wherein the [linear] encoder applies the matrix to perform a vector multiplication on the blocks of K information bearing symbols to produce *the* blocks of N precoded symbols, and applies each block of N precoded symbols across the N subcarriers.

11. The wireless communication device of claim 1, wherein the wireless communication device comprises one of a base station and a mobile device.

12. A wireless communication device comprising:

an encoder that applies a plurality of M matrices to linearly transform a stream of information bearing symbols selected from a constellation having a finite alphabet to produce a stream of precoded symbols that are complex numbers and *that* are not restricted by the constellation of the information bearing symbols; and a modulator [to produce] *that produces* an output waveform in accordance with the stream of precoded symbols for transmission through a wireless channel, where the matrices are identical and collectively have M*L redundant rows, where L represents an order of the *wireless* channel.

13. A wireless communication device comprising:

a demodulator that receives a waveform carrying a encoded transmission and *that* produces a demodulated data stream, *the encoded transmission including an encoded data stream,* wherein the encoded data stream was produced by *performing error-control coding on an input stream to produce coded symbols, interleaving the coded symbols to produce interleaved symbols, mapping the interleaved symbols to produce a stream of information bearing symbols selected from a constellation having a finite alphabet, and* applying a linear transformation to [a] *the* stream of information bearing symbols selected from [a] *the* constellation having [a] *the* finite alphabet to produce a stream of precoded symbols that are complex numbers and *that* are not restricted by the constellation of the information bearing symbols; and a decoder that decodes the demodulated data *stream* to produce estimated data.

14. The wireless communication device of claim 13, wherein the decoder applies one of maximum-likelihood detection, zero-force (ZF) detection, minimum mean squared error (MMSE) detection, decision-directed detection, iterative detection, to decode the demodulated data *stream*.

15. The wireless communication device of claim 13, wherein the wireless communication device comprises one of a base station and a mobile device.

16. A method comprising:

*performing error-control coding on an input stream to produce coded symbols;*

*interleaving the coded symbols to produce interleaved symbols;*

*mapping the interleaved symbols to produce a stream of information bearing symbols selected from a constellation having a finite alphabet;* applying a linear transformation to [a] *the* stream of information bearing symbols selected from [a] *the* constellation having [a] *the* finite alphabet to produce a stream of precoded symbols that are complex numbers and *that* are not restricted by the constellation of the information bearing symbols; and outputting a waveform in accordance with the stream of precoded symbols for transmission through a wireless channel.

17. The method of claim 16, wherein outputting the waveform comprises:

outputting the output waveform as a multicarrier waveform having a set of subcarriers; and encoding the stream of information bearing symbols so that the subcarriers carry different linear combinations of information symbols.

18. The method of claim 16, wherein applying the linear transformation to the stream of information bearing symbols comprises applying a unitary matrix to the stream of information bearing symbols.

19. A method comprising:

*performing error-control coding on an input stream to produce coded symbols;*

*interleaving the coded symbols to produce interleaved symbols;*

*mapping the interleaved symbols to produce blocks of K information bearing symbols selected from a constellation having a finite alphabet;* applying a matrix to linearly transform *the* blocks of K information bearing symbols that are selected from [a] *the* constellation having [a] *the* finite alphabet to produce blocks of N precoded symbols that are complex numbers and *that* are not restricted by the constellation of the information bearing symbols, and outputting a multicarrier waveform having a set of subcarriers in accordance with the [stream of] *blocks of N* precoded symbols for transmission through a wireless channel, where N is the number of subcarriers, and K is less than or equal to N.

20. The method of claim 19, wherein applying the [linear transformation] *matrix* comprises applying [the linear transformation] *a matrix of size N×K* to *the* blocks of K information bearing symbols to produce blocks of N precoded symbols at a code rate r=K/N.

21. The method of claim 19, wherein applying the [linear transformation] *matrix* comprises applying a *unitary* matrix of size N×K to the blocks of *K* information bearing symbols, *wherein K is equal to N*.

22. The method of claim 19, further comprising selecting the number of symbols per block K as a function of an order of the channel.

23. The method of claim 19, further comprising selecting the number of symbols per block *K* so that K≥N−L, wherein L represents an order of the channel.

24. The method of claim 19, further comprising selecting the number of symbols per block *K* so that K=N−L, where L represents an order of the channel.

25. The method of claim 19, wherein applying the [linear transformation] *matrix* comprises applying a matrix to perform a vector multiplication on the blocks of K information bearing symbols to produce *the* blocks of N precoded symbols.

26. A method comprising:

applying a plurality of M matrices to linearly transform a stream of information bearing symbols selected from a constellation having a finite alphabet, wherein the M matrices linearly transform the stream of information bearing symbols to produce a stream of precoded symbols that are complex numbers and *that* are not restricted by the constellation of the information bearing symbols; and outputting a waveform in accordance with the stream of precoded symbols for transmission through a wireless channel, where the matrices are identical and have M*L redundant rows and, where L represents an order of the channel.

27. A *non-transitory* computer-readable medium comprising instructions to cause a programmable processor to:

*perform error-control coding on an input stream to produce coded symbols;*

*interleave the coded symbols to produce interleaved symbols;*

*map the interleaved symbols to produce a stream of information bearing symbols selected from a constellation having a finite alphabet;* apply a linear transformation to a stream of information bearing symbols selected from [a] *the* constellation having [a] *the* finite alphabet to produce a stream of precoded symbols that are complex numbers and are not restricted by the constellation of the information bearing symbols; and output waveform in accordance with the stream of precoded symbols for transmission through a wireless channel.

28. The *non-transitory* computer-readable medium of claim 27, further comprising instructions to cause the programmable processor to:

output the output waveform as a multicarrier waveform having a set of subcarriers; and encode the stream of information bearing symbols so that the subcarriers carry different linear combinations of information symbols.

*29. The wireless communication device of claim 1, wherein the output waveform comprises multiple output waveforms for transmission on multiple antennas, respectively.*

*30. The wireless communication device of claim 29, wherein the linear transformation is based on multiple matrices comprising a first matrix and a second matrix, wherein the first matrix is based on a fast Fourier transform (FFT) matrix, and wherein the second matrix is based on a diagonal matrix to phase-rotate each entry of a symbol vector.*

*31. The wireless communication device of claim 30, wherein the number of the antennas is represented by $N_t$, wherein the first matrix is based on an $N_t$-point inverse version of the FFT matrix, wherein the linear transformation is based on:*

$$\Theta = F_{N_t}^T \operatorname{diag}(1, \alpha, \ldots, \alpha^{N_t-1}), \alpha := e^{j2\pi/P}$$

*wherein $F_{N_t}^T$ represents the first matrix, and wherein*

*diag(1, α, . . . , $\alpha^{N_t-1}$)*

*represents the second matrix, wherein P is an integer.*

*32. The wireless communication device of claim 29, wherein the number of the antennas is represented by $N_t$, and wherein the linear transformation is based on a Vandermonde matrix of size $N_t \times N_t$.*

*33. The wireless communication device of claim 29, wherein the number of the antennas is represented by $N_t$, wherein the linear transformation is based on multiple matrices comprising a first matrix and a second matrix,*

*wherein the first matrix is a matrix of size $N_t \times N_t$, wherein each entry of the first matrix is based on a power of $e^{j2\pi/N_t}$, each entry of a column of the first matrix being equal to one, and*

*wherein the second matrix is a diagonal matrix of size $N_t \times N_t$ having diagonal entries that are based respectively on different powers of $e^{j2\pi/P}$ including the zeroth power, wherein P is an integer.*

*34. The wireless communication device of claim 33, wherein the multiple matrices include a third matrix, wherein the third matrix is a matrix of size $N_t \times N_t$.*

*35. The wireless communication device of claim 1, wherein the output waveform comprises an orthogonal frequency division multiplexing (OFDM) waveform.*

*36. The method of claim 16, wherein interleaving the coded symbols to produce the interleaved symbols comprises writing the coded symbols into a matrix row-wise, and reading the encoded symbols from the matrix column-wise.*

*37. The method of claim 16, wherein performing the error-control coding on the input stream comprises applying at least one of a turbo code and a convolutional code, wherein the constellation having the finite alphabet is a quadrature amplitude modulation (QAM) constellation, and wherein mapping the interleaved symbols comprises selecting symbols from the QAM constellation as the information bearing symbols.*

*38. The method of claim 16, wherein applying the linear transformation comprises applying the linear transformation to the stream of information bearing symbols to produce the stream of precoded symbols such that the stream of precoded symbols differs, at least in part, from the stream of information bearing symbols, wherein the stream of precoded symbols includes complex numbers.*

*39. The method of claim 16, wherein outputting the waveform comprises outputting multiple waveforms via multiple antennas, respectively.*

*40. The method of claim 39, wherein the linear transformation is based on multiple matrices comprising a first matrix and a second matrix, wherein the first matrix is based on a fast Fourier transform (FFT) matrix, and wherein the second matrix is based on a diagonal matrix to phase-rotate each entry of a symbol vector.*

*41. The method of claim 40, wherein the number of the antennas is represented by $N_t$, wherein the first matrix is based on an $N_t$-point inverse version of the FFT matrix, wherein the linear transformation is based on:*

$$\Theta = F_{N_t}^T \operatorname{diag}(1, \alpha, \ldots, \alpha^{N_t-1}), \alpha := e^{j2\pi/P}$$

*wherein $F_{N_t}^T$ represents the first matrix, and wherein*

*diag(1, α, . . . , $\alpha^{N_t-1}$)*

*represents the second matrix, wherein P is an integer.*

*42. The method of claim 39, wherein the number of the antennas is represented by $N_t$, and wherein the linear transformation is based on a Vandermonde matrix of size $N_t \times N_t$.*

*43. The method of claim 39, wherein the number of the antennas is represented by $N_t$, wherein the linear transformation is based on multiple matrices comprising a first matrix and a second matrix,*

*wherein the first matrix is a matrix of size $N_t \times N_t$, wherein each entry of the first matrix is based on a power of $e^{j2\pi/N_t}$, each entry of a column of the first matrix being equal to one, and*

*wherein the second matrix is a diagonal matrix of size $N_t \times N_t$ having diagonal entries that are based respectively on different powers of $e^{j2\pi/P}$ including the zeroth power, wherein P is an integer.*

*44. The method of claim 43, wherein the multiple matrices include a third matrix, wherein the third matrix is a matrix of size $N_t \times N_t$.*

*45. The method of claim 16, wherein outputting the waveform comprises outputting an orthogonal frequency division multiplexing (OFDM) waveform.*

*46. The method of claim 18, wherein applying the unitary matrix comprises applying a unitary matrix of size M×M in which all entries have equal norm of $1/\sqrt{M}$, where M is an integer greater than one.*

*47. The method of claim 19, wherein outputting the multicarrier waveform comprises outputting multiple waveforms via multiple antennas, respectively.*

*48. The method of claim 19, wherein outputting the multicarrier waveform comprises outputting an orthogonal frequency division multiplexing (OFDM) waveform.*

*49. A method comprising:*

*applying a linear transformation to a stream of information bearing symbols selected from a constellation having a finite alphabet to produce a stream of precoded*

*symbols that are complex numbers and that are not restricted by the constellation of the information bearing symbols; and*

*outputting a waveform in accordance with the stream of precoded symbols for transmission through a wireless channel,*

*wherein the method further comprises:*

*performing error-control coding on an input data stream to produce coded bits;*

*interleaving the coded bits to produce interleaved bits;*

*mapping groups of the interleaved bits to produce the stream of information bearing symbols selected from the constellation having the finite alphabet, wherein a size of the constellation is larger than two, and wherein interleaving the coded bits comprises separating the coded bits so that neighboring coded bits are mapped to different information bearing symbols.*

*50. The method of claim 49, wherein interleaving the coded bits to produce the interleaved bits comprises writing the coded bits into a matrix row-wise, and reading the coded bits from the matrix column-wise.*

*51. The method of claim 49, wherein interleaving the coded bits to produce the interleaved bits comprises positioning the coded bits to be mapped to different blocks of information bearing symbols.*

*52. The method of claim 49, wherein performing the error-control coding on the input stream comprises applying a turbo code.*

*53. The method of claim 49, wherein performing the error-control coding on the input stream comprises applying a convolutional code.*

*54. The method of claim 49, wherein the constellation having the finite alphabet is based on quadrature amplitude modulation (QAM).*

*55. The method of claim 49, wherein the constellation having the finite alphabet is based on quadrature phase shift keying (QPSK).*

*56. The method of claim 49, wherein applying the linear transformation comprises applying a unitary matrix of size $M \times M$ in which all entries have equal norm of $1/\sqrt{M}$, where M is an integer greater than one.*

*57. The method of claim 49, wherein outputting the waveform comprises outputting multiple waveforms via multiple antennas, respectively.*

*58. The method of claim 49, wherein outputting the waveform comprises outputting an orthogonal frequency division multiplexing (OFDM) waveform.*

*59. A wireless communication device comprising:*

*an encoder that applies a linear transformation to a stream of information bearing symbols selected from a constellation having a finite alphabet to produce a stream of precoded symbols that are complex numbers and that are not restricted by the constellation of the information bearing symbols;*

*a modulator that produces an output waveform in accordance with the stream of precoded symbols for transmission through a wireless channel; and*

*circuitry configured to (i) perform error-control coding on an input stream to produce coded bits, (ii) interleave the coded bits to produce blocks of interleaved bits, and (iii) map the blocks of interleaved bits to produce the stream of information bearing symbols selected from the constellation having the finite alphabet.*

*60. The wireless communication device of claim 59, wherein a size of the constellation is larger than two, and wherein the circuitry is configured to separate the coded bits so that neighboring coded bits are mapped to different information bearing symbols.*

*61. The wireless communication device of claim 59, wherein the wireless communication device comprises one of a base station and a mobile device.*

*62. The wireless communication device of claim 59, wherein the output waveform comprises multiple output waveforms for transmission on multiple antennas, respectively.*

*63. The wireless communication device of claim 59, wherein the output waveform comprises an orthogonal frequency division multiplexing (OFDM) waveform.*

*64. A method comprising:*

*applying a linear transformation to a stream of information bearing symbols selected from a constellation having a finite alphabet to produce a stream of precoded symbols that are complex numbers and that are not restricted by the constellation of the information bearing symbols; and*

*outputting, via multiple antennas, waveforms in accordance with the stream of precoded symbols for transmission through a wireless channel,*

*wherein the linear transformation is based on multiple matrices comprising a first matrix and a second matrix, wherein the first matrix is based on a fast Fourier transform (FFT) matrix, and wherein the second matrix is based on a diagonal matrix to phase-rotate each entry of a symbol vector.*

*65. The method of claim 64, wherein the number of the antennas is represented by $N_t$, and wherein the first matrix is based on an $N_t$-point inverse version of the FFT matrix.*

*66. The method of claim 65, wherein the linear transformation is based on:*

$$\Theta = F_{N_t}^{T}\,\mathrm{diag}(1, \alpha, \ldots, \alpha^{N_t-1}),\ \alpha := e^{j2\pi/P}$$

*wherein $F_{N_t}^{T}$ represents the first matrix, and wherein*

$$\mathrm{diag}(1, \alpha, \ldots, \alpha^{N_t-1})$$

*represents the second matrix, wherein P is an integer.*

*67. The method of claim 64, wherein the method further comprises:*

*performing error-control coding on an input data stream to produce coded bits;*

*interleaving the coded bits to produce interleaved bits;*

*mapping groups of the interleaved bits to produce the stream of information bearing symbols selected from the constellation having the finite alphabet, wherein a size of the constellation is larger than two, and wherein interleaving the coded bits comprises separating the coded bits so that neighboring coded bits are mapped to different information bearing symbols.*

*68. A device comprising:*

*an encoder that applies a linear transformation to a stream of information bearing symbols selected from a constellation having a finite alphabet to produce a stream of precoded symbols that are complex numbers and that are not restricted by the constellation of the information bearing symbols; and*

*a modulator that produces output waveforms in accordance with the stream of precoded symbols for transmission through a wireless channel via multiple antennas,*

*wherein the linear transformation is based on multiple matrices comprising a first matrix and a second matrix, wherein the first matrix is based on a fast Fourier trans-*

*form (FFT) matrix, and wherein the second matrix is based on a diagonal matrix to phase-rotate each entry of a symbol vector.*

*69. The device of claim 68, wherein the number of the antennas is represented by $N_t$, and wherein the first matrix is based on an $N_t$-point inverse version of the FFT matrix.*

*70. The device of claim 68, wherein the linear transformation is based on:*

$$\Theta = F_{N_t}^{T}\,\mathrm{diag}(1, \alpha, \ldots, \alpha^{N_t-1}),\ \alpha := e^{j2\pi/P}$$

*wherein $F_{N_t}^{T}$ represents the first matrix, and wherein*

$\mathrm{diag}(1, \alpha, \ldots, \alpha^{N_t-1})$

*represents the second matrix, wherein P is an integer.*

*71. The device of claim 68, further comprising:*

*circuitry configured to (i) perform error-control coding on an input stream to produce coded bits, (ii) interleave the coded bits to produce blocks of interleaved bits, and (iii) map the blocks of interleaved bits to produce the stream of information bearing symbols selected from the constellation having the finite alphabet.*

*72. The device of claim 68, wherein the output waveforms comprises orthogonal frequency division multiplexing (OFDM) waveforms.*

*73. The wireless communication device of claim 29, wherein the linear transformation is based on a Fourier transform.*

*74. The wireless communication device of claim 34, wherein the third matrix is a unitary matrix.*

*75. The method of claim 39, wherein the linear transformation is based on a Fourier transform.*

*76. The method of claim 44, wherein the third matrix is a unitary matrix.*

*77. The wireless communication device of claim 13, wherein the linear transformation is based on a Fourier transform.*

* * * * *

UNITED STATES PATENT AND TRADEMARK OFFICE

CERTIFICATE OF CORRECTION

PATENT NO. : RE45,230 E
APPLICATION NO. : 13/858734
DATED : November 4, 2014
INVENTOR(S) : Georgios B. Giannakis, Yan Xin and Zhengdao Wang It is certified that error appears in the above-identified patent and that said Letters Patent is hereby corrected as shown below:

Title page, Column 2, Line 3 References cited (Other Publications), delete "inWireless" and insert -- in Wireless --, therefor.

Page 2, Column 1, Line 28 References cited (Other Publications), delete "Zilrich," and insert -- Zurich, --, therefor.

Page 2, Column 1, Line 30 References cited (Other Publications), delete "SF," and insert -- SP, --, therefor.

Page 2, Column 1, Line 32 References cited (Other Publications), delete "of" and insert -- of a --, therefor.

Page 2, Column 1, Line 34 References cited (Other Publications), delete "codes" and insert -- "code" --, therefor.

Page 2, Column 1, Line 34 References cited (Other Publications), delete "of" and insert -- for --, therefor.

Page 2, Column 1, Line 35 References cited (Other Publications), delete "Common." and insert -- Commun. --, therefor.

Page 2, Column 2, Line 26 References cited (Other Publications), delete "3mITG" and insert -- 3rd ITG --, therefor.

Page 2, Column 2, Line 54 References cited (Other Publications), delete "muitipath" and insert -- multipath --, therefor.

Page 3, Column 1, Line 11 References cited (Other Publications), delete "lat" and insert -- flat --, therefor.

Signed and Sealed this
Twenty-eighth Day of April, 2015

Michelle K. Lee

Michelle K. Lee
*Director of the United States Patent and Trademark Office*

Page 3, Column 2, Line 9 References cited (Other Publications), delete “Biridtcuser,” and insert -- Birkhäuser, --, therefor.

Page 3, Column 2, Line 16 References cited (Other Publications), delete “Facing” and insert -- Fading --, therefor.

Page 3, Column 2, Line 17 References cited (Other Publications), delete “Berdun,” and insert -- Verdun, --, therefor.

Page 3, Column 2, Line 33 References cited (Other Publications), delete “transfonn,” and insert -- transform, --, therefor.

Page 3, Column 2, Line 61 References cited (Other Publications), delete “coes,”” and insert -- codes,” --, therefor.

Page 4, Column 2, Line 22 References cited (Other Publications), delete “Facing” and insert -- Fading --, therefor.

Page 4, Column 2, Line 23 References cited (Other Publications), delete “Berdun,” and insert -- Verdun, --, therefor.

Page 5, Column 2, Line 13 References cited (Other Publications), delete “OFDMW” and insert -- OFDM --, therefor.

Page 5, Column 2, Line 42 References cited (Other Publications), delete “Transmission” and insert -- Transmissions --, therefor.

Page 5, Column 2, Line 48 References cited (Other Publications), delete “No. 15,” and insert -- Nov. 15, -- therefor.

Page 5, Column 2, Line 50 References cited (Other Publications), delete “J. Boutos” and insert -- J. Boutros --, therefor.

Page 5, Column 2, Line 58 References cited (Other Publications), delete “of” and insert -- on --, therefor.

Page 5, Column 2, Line 61 References cited (Other Publications), delete “Leau,” and insert -- Leus, --, therefor.

Page 5, Column 2, Line 65 References cited (Other Publications), delete ““Basic” and insert -- “Basis --, therefor.

Page 5, Column 2, Line 69 References cited (Other Publications), delete “Effect” and insert -- Effects --, therefor.

Page 6, Column 1, Line 2 References cited (Other Publications), delete "Tockyo," and insert -- Tokyo, --, therefor.

Page 6, Column 1, Line 5 References cited (Other Publications), delete "Transaction" and insert -- Transactions --, therefor.

Page 6, Column 1, Line 7 References cited (Other Publications), delete "Speading" and insert -- Spreading --, therefor.

Page 6, Column 1, Line 8 References cited (Other Publications), delete "Orthagonality" and insert -- Orthogonality --, therefor.

Page 6, Column 1, Line 22 References cited (Other Publications), delete "Transmission"." and insert -- Transmissions". --, therefor.

Page 6, Column 1, Line 23 References cited (Other Publications), delete "Tranmit" and insert -- Transmit --, therefor.

Page 6, Column 2, Line 2 References cited (Other Publications), delete "Transmission" and insert -- Transmissions --, therefor.

Page 6, Column 2, Line 9 References cited (Other Publications), delete "Spectrally-Shaped" and insert -- Spectrally Shaped --, therefor.

Page 6, Column 2, Line 14 References cited (Other Publications), delete "Capabilitites,"" and insert -- Capabilities," --, therefor.

Page 6, Column 2, Line 24 References cited (Other Publications), delete "A. Wiineben," and insert -- A. Wittneben, --, therefor.

Page 6, Column 2, Line 28 References cited (Other Publications), delete "Timecoding" and insert -- Time Coding --, therefor.

Page 6, Column 2, Line 30 References cited (Other Publications), delete "369-272," and insert -- 269-272, --, therefor.

In the Specification

Column 1, Line 10, insert the following paragraph -- This application is a reissue application of United States Patent No. 7,292,647, issued on November 6, 2007. --.

Column 2, Lines 51-52, please delete "signal space diversity [concepts to allow for redundant encoding]" and insert -- signal space diversity concepts to allow for redundant encoding --, therefor.

Figure 11:
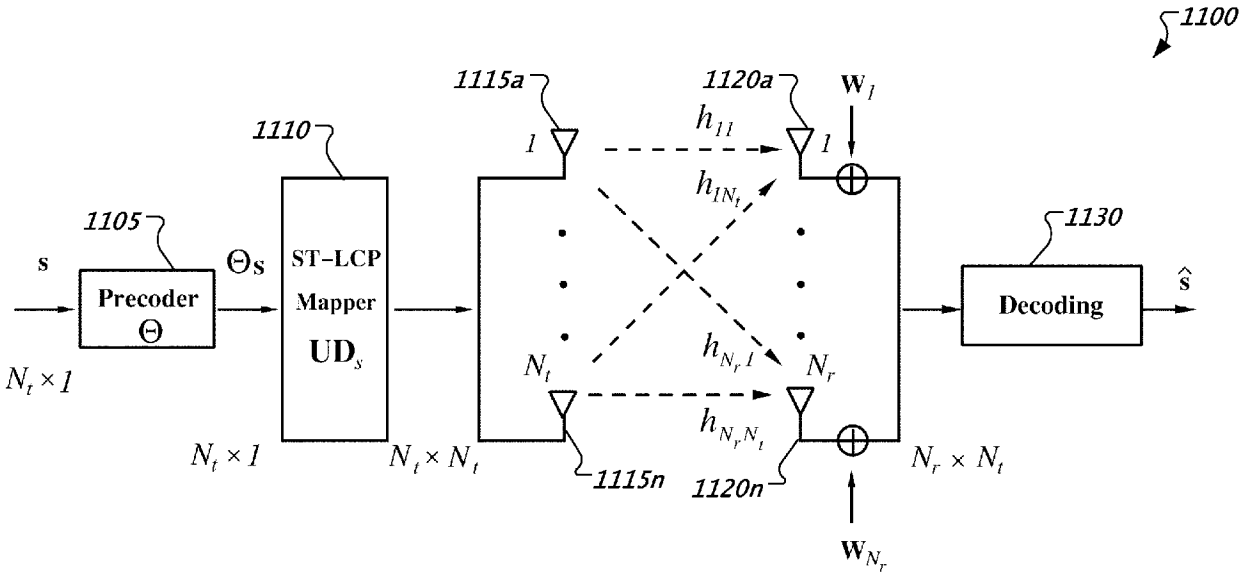

Column 4, Line 11, insert the following paragraphs -- FIG. 11 shows an architecture of an example of a wireless communication system with multiple transmit antennas and multiple receiver antennas.

Figure 12:
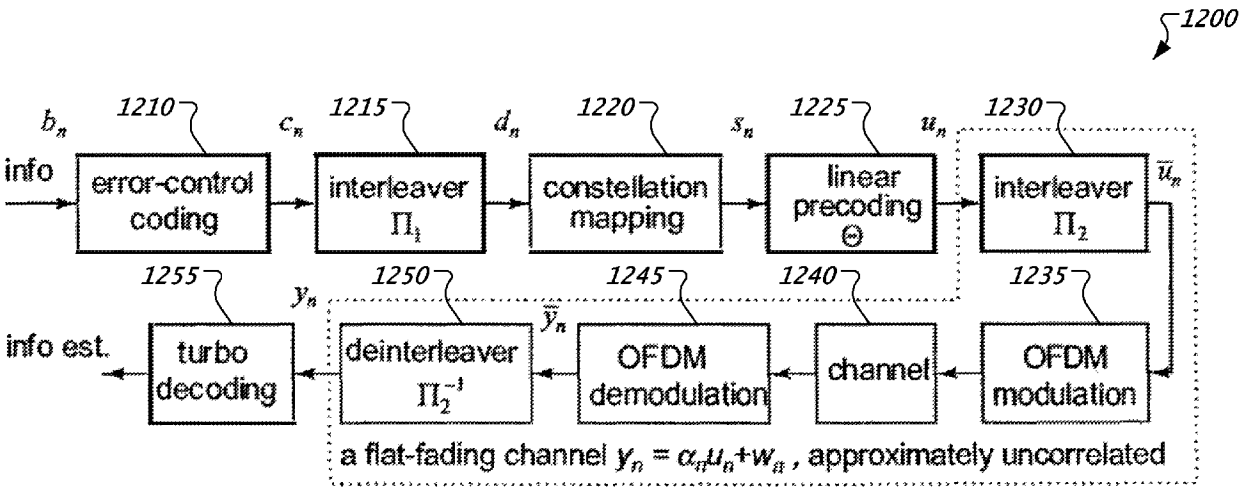

FIG. 12 shows an architecture of an example of a wireless communication system that uses coded and linearly precoded OFDM transmissions. --.

Column 10, Lines 6-7 (approx.), please delete "Rayleigh fading [channel offers us L+1 independent fading]" and insert -- Rayleigh fading channel offers us L+1 independent fading --, therefor.

Column 21, Line 31, insert the following paragraphs

-- Precoding for Multi-Antenna Communications

A wireless communication system can use multiple antennas for transmitting data. Further, the system can use space-time (ST) block codes and linear constellation precoding (LCP).

Our designs are based either on parameterizations of unitary matrices, or, on algebraic number-theoretic constructions. With an arbitrary number of $N_t$ transmit- and $N_r$ receive-antennas, ST-LCP achieves rate 1 symbol/sec/Hz, and enjoys diversity gain as high as $N_tN_r$ over (possibly correlated) quasi-static, and fast fading channels. As figures of merit, we use diversity and coding gains as well as mutual information of the underlying multi-input multi-output (MIMO) system. We show that over QAM and PAM constellations, such LCP achieves the upper-bound on the coding gain of all linear precoders for certain values of $N_t$, and comes close to this upper-bound for other values of $N_t$, in both correlated and independent fading channels. Compared with existing ST block codes adhering to an orthogonal design (ST-OD), ST-LCP offers not only better performance, but also higher mutual information for $N_t > 2$. For decoding ST-LCP, we adopt the near-optimum sphere-decoding algorithm, as well as reduced-complexity sub-optimum alternatives. Although ST-OD codes afford simpler decoding, the tradeoff between performance and rate versus complexity favors the ST-LCP codes when $N_t$, $N_r$ or the spectral efficiency of the system increase.

Let $^{\mathrm{T}}$ and $^{\mathrm{H}}$ represent transpose and conjugate transpose, respectively; Tr(·) denotes trace; $[\cdot]_{mn}$ denotes the $(m,n)$th entry of a matrix; $\mathbf{I}_{N_t}$ denotes an $N_t \times N_t$ identity matrix; $diag(d_1,\ldots,d_P)$ denotes a diagonal matrix with diagonal entries $d_1,\ldots,d_P$; N, Z, Q, R, and C stand for the positive integer set, the integer ring, the rational number field, the real number field, and the complex number field, respectively; $j$ denotes $\sqrt{-1}$.

Further, let Q($j$) denote the smallest subfield of C including both Q and $j$, and Q($j$)($\alpha$) denotes the smallest subfield of C including both Q($j$) and $\alpha$, where $\alpha$ is algebraic over Q($j$); i.e., $\alpha$ is a root of some nonzero polynomial $\in$ Q($j$)[$x$ ; Z[$j$] is the ring of Gaussian integers, whose elements are in the form of $a + jb$ with $a,b \in$ Z; $m_{\alpha,F}(x)$ denotes the minimal polynomial of $\alpha$ over a field F with deg($m_{a,F}(x)$) denoting its degree.

FIG. 11 shows an architecture of an example of a wireless communication system 1100 with multiple transmit antennas and multiple receiver antennas. The wireless communication system 1100 includes a wireless link with $N_t$ transmit antennas 1115a-1115n, and $N_r$ receive antennas 1120a-1120n over Rayleigh flat fading channels. The symbol stream $s_i$ from a normalized constellation set C is first parsed into $N_t \times 1$ signal vectors s, and then it is linearly precoded by an $N_t \times N_t$ matrix $\Theta$ via a precoder 1105. Note that average symbol energy of C is assumed to be 1. The precoded block $\Theta$s is fed to a ST-LCP mapper 1110, which maps $\Theta$s to an $N_t \times N_t$ code matrix S that is sent over the $N_t$ antennas 1115a-n during $N_t$ time intervals. Specifically, the ($m$,$i$)th entry $s_{mi} := u_{mi}\theta_i^T \mathbf{s}$, is transmitted through the $m$ th antenna at the $i$ th time interval, where $u_{mi}$ denotes the ($m$,$i$)th entry of a unitary matrix U; i.e., $[\mathbf{U}]_{mi} := u_{mi}$; and vector $\theta_i^T$ denotes the $i$ th row of $\Theta$. Defining $\mathbf{D}_s := diag(\theta_1^T\mathbf{s},\ldots,\theta_{N_t}^T\mathbf{s})$,we can thus write the $N_t \times N_t$ transmitted ST-LCP code matrix S as S = UD,. The $N_r$ receive antennas 1120a-1120n are coupled with a decoder 1130.

Square-root Nyquist pulses are used as transmit- and receive-filters in all antennas. After receive-filtering and symbol rate sampling, the signal $y_{ni}$ received by antenna $n$ at the $i$ th time interval is a noisy superposition of $N_t$ faded transmitted signals; i.e., $y_{ni} = \sum_{m=1}^{N_t} h_{nm} u_{mi} \theta_i^T \mathbf{s} + w_{ni}$, where $h_{nm}$ denotes the fading coefficient between the $m$ th transmitter, and the $n$ th receiver antenna. We assume that (1) $h_{nm}$ channel coefficients are uncorrelated with the noise $w_{ni}$, zero mean, complex Gaussian, with correlation matrix $R_h := E(hh^H) > 0$, where $h := [h_{11},\ldots,h_{N_t 1};\ldots;h_{1N_r},\ldots,h_{N_t N_r}]$; (2) $h_{nm}$ channel coefficients are only known to the receiver, and remain invariant over $N_t$ intervals (*quasi-static flat fading*); and (3)$w_{ni}$ noise samples are independent identically distributed (i.i.d.), complex Gaussian with zero mean, and variance $N_0/2$ per dimension. Notice that our flat fading channels are allowed to be correlated.

Let Y be the $N_r \times N_t$ received signal matrix with ($n$,$i$) th entry $[\mathbf{Y}]_{ni} = y_{ni}$; H the $N_r \times N_t$ channel matrix with $[\mathbf{H}]_{nm} = h_{nm}$; and W the $N_r \times N_t$ noise matrix with $[\mathbf{W}]_{ni} = w_{ni}$. The input-output relationship can then be written in matrix form as Y = HS + W = HUD, + W. If U is chosen to be identity, the ST transmission in this equation for Y reduces to a TDMA-like transmission with each antenna pausing for $(N_t - 1)$ out of $N_t$ time intervals. If H is a complex Gaussian matrix with zero-mean i.i.d. entries and U is a unitary matrix, the distribution of HU is the same as the distribution of H. Thus, the probability of error remains invariant to U. However, U offers some flexibility that could be used to e.g., alleviate high power amplifier nonlinear effects because it can avoid the unnecessary "on-off" switch for each antenna.

This patent document introduces novel LCP constructions including LCP-A and LCP-B. It can be shown that LCP-A can achieve the upper-bound on the coding gain over QAM (or PAM) for $N_t = 2^m$, where $m \in \mathrm{N}$, or, for $N_t = \phi(P)$, where $\phi(P)$ is an Euler number, and $P \not\equiv 0 \pmod 4$. It can be shown that LCP-B, which is unitary for any $N_t$, has coding gain that is guaranteed to be greater than a lower bound.

LCP-A constructs a matrix $\Theta$ that applies to any number of transmit-antennas $N_t \in \mathrm{N}$. Note that when $N_t$ is a power of two, the resulting precoder for LCP-A is unitary. When $N_t$ is not a power of two, the construction yields non-unitary LCP matrices. Let $\alpha$ be integral over $Z[j]$ such that $\deg(m_{\alpha,Q(j)}(x)) = N_t$. LCP-A is constructed as follows:

$$\Theta = \frac{1}{\lambda}\begin{bmatrix} 1 & \alpha_1 & \dots & \alpha_1^{N_t-1} \\ 1 & \alpha_2 & \dots & \alpha_2^{N_t-1} \\ \vdots & \vdots & & \vdots \\ 1 & \alpha_{N_t} & \dots & \alpha_{N_t}^{N_t-1} \end{bmatrix},$$

where $\{\alpha_m\}_{m=1}^{N_t}$ are the roots of $m_{\alpha,Q(j)}(x)$, $\alpha_1 := \alpha$, and $1/\lambda$ is the normalizing factor ensuring that $\mathrm{Tr}(\Theta\Theta^{\mathrm{H}}) = N_t$.

LCP-B provides a construction of unitary precoders for any number of transmit-antennas $N_t \in \mathrm{N}$:

$$\Theta = \mathbf{F}_{N_t}^T diag(1, \alpha, \dots, \alpha^{N_t-1}), \qquad \alpha := e^{j2\pi/P}$$

where $P \in \mathrm{N}$, and $\mathbf{F}_{N_t}$ is the $N_t$ -point inverse fast Fourier transform (IFFT) matrix whose *(m,n)st* entry is given by $N_t^{-1/2}\exp(j2\pi(m-1)(n-1)/N_t)$. Notice that this LCP matrix amounts to phase-rotating each entry of the symbol vector s, and then modulating in a digital multicarrier fashion that is implemented via $\mathbf{F}_{N_t}^T$.

Joint Coding-Precoding

FIG. 12 shows an architecture of an example of a wireless communication system 1200 that uses coded and linearly precoded OFDM transmissions. A transmitter of the system 1200 includes an error-control coder 1210, a $\Pi_1$ interleaver 1215, constellation mapper 1220, linear precoder 1225, a $\Pi_2$ interleaver 1230, and OFDM modulator 1235. A receiver of the system 1200 includes an OFDM demodulator 1245, a deinterleaver 1250, and a turbo decoder 1255. The transmitter transmiters an output of the OFDM modulator 1235 to the receiver via a wireless channel 1240.

A stream of information bits $\{b_n\}$is first encoded using error-control coding, e.g., convolutional and turbo codes, other codes are also applicable, by the error-control coder 1210. The coded symbols, denoted by $c_n$, go through the $\Pi_1$ interleaver 1215, that outputs permuted symbols denoted by $d = \Pi_1[c_n]$. The symbols $d_n$ are mapped to constellation symbols $s_n \in$ A, where A denotes the constellation alphabet of size | A |, by constellation mapper 1220. The same subscript $n$ for $d_n$ and $s_n$ can be used, but it should be understood that several consecutive symbols $d_n$ can be mapped to one constellation symbol, in which case the two subscripts will index streams of different rates; the same applies to the bit streams $b_n$ and $c_n$. Possible constellations include binary phase-shift keying (BPSK), quadrature phase shift keying (QPSK), and $M$-ary quadrature amplitude modulation (QAM). Constellation mapping can use Gray Labeling, if necessary.

After constellation mapping, successive blocks of $M$ symbols $s_t := [s_{iM}, s_{iM+1}, \ldots, s_{iM+M-1}]^T$ are linearly precoded by a matrix $\Theta$ of size $M \times M$, and a precoded block $u_i = \Theta s_i$ is obtained via precoder 1225. The block size $M$ is a design parameter. Each block $u_i$ is serialized to $u_{iM}, u_{iM+1}, \ldots, u_{iM+M-1}$. The precoded symbols $\{u_n\}$ are interleaved by a $\Pi_2$ interleaver 1230, whose role is to decorrelate the channel 1240 in the frequency domain. With an increased size, the $\Pi_2$ interleaver 1230 can also decorrelate the channel in the time-domain, although this can be achieved equally well by increasing the size of the $\Pi_1$ interleaver 1215. The output of $\Pi_2$ interleaver 1230, denoted by $\bar{u}_n = \Pi_2[u_n]$, is passed on to the OFDM modulator 1235, which includes serial-to-parallel conversion to blocks of size $N$ (the OFDM symbol size), IFFT, and cyclic prefix insertion.

The channel 1240 is modeled as slowly varying and frequency-selective. The symbol-rate sampled channel at baseband can be modeled as a finite impulse response (FIR) filter of order $L$ with impulse response $h[n] = \sum_{l=0}^{L} h_l \delta[n-l]$ ,where $h_l$ are slowly varying channel taps modeled as wide-sense stationary random processes. The frequency response of the channel is denoted as $H(f) := \sum_{l=0}^{L} h_l e^{-j2\pi fl}$ . We will adopt for each tap a complex Gaussian distribution of zero-mean with equal-variance real and imaginary parts; i.e., each $h_l$ obeys the Rayleigh fading model. The channel variation is slow enough so that: i) $h[n]$ remains approximately invariant within one OFDM symbol; and ii) reliable estimation of $h[n]$ is possible. Although the channel remains constant over one OFDM symbol, we allow it to vary from OFDM symbol to OFDM symbol according to Jakes' fading model. We will also suppose that perfect channel information and synchronization have been acquired at the receiver.

The receiver of the system 1200 first performs "OFDM demodulation" by discarding the cyclic prefix per block to form the received OFDM symbols (which are blocks of size $N$) that are subsequently FFT processed via the OFDM demodulator 1245. The $l$ th resulting sample $\bar{y}_{(k-1)N+l}$ in the $k$ th demodulated OFDM symbol can be written as $$\bar{y}_{(k-1)N+l} = H(l/N)\bar{u}_{(k-1)N+l} + \bar{\eta}_{(k-1)N+l},$$

where $l \in [0, N-1], k = 0,1,\ldots,$ and $\bar{\eta}$ is the FFT processed additive white Gaussian noise (AWGN). The variance of the noise is $N_0/2$ per real dimension. Since the FFT is a linear transform, the frequency response variates $\{H(l/N) : l \in [0, N-1]\}$ are also complex Gaussian but correlated, in general; e.g., although the FFT is an orthogonal transformation, if $N > L + 1$, the $N$ variates are correlated even though the $(L + 1)$ impulse response taps are independent. If we define $y_n = \Pi_2^{-1}[\bar{y}_n]$, $\eta_n = \Pi_2^{-1}[\bar{\eta}_n]$, and $\alpha_n := \Pi_2^{-1}[H((n \bmod N)/N)]$, then the deinterleaved version of the equation for $\bar{y}_{(k-1)N+l}$ can be expressed as $$y_n = \alpha_n u_n + \eta_n.$$

With a well designed $\Pi_2$ of large enough size, the correlation between $\alpha_n$'s can be greatly reduced. It can be assumed for an idealized case that $\alpha_n$'s are uncorrelated Gaussian random variables with zero-mean. Their variance will be normalized to one by dividing each $\alpha_n$ by the ensemble average of the channel energy.

The notion of signal space diversity was originally introduced for flat-fading Rayleigh channels. The idea in our setup, that allows also for frequency-selective fading, is to rotate the $M$-dimensional vectors $\{s_i \in A^M\}$ using a unitary matrix $\Theta$ so that the resulting signal set $\{u : u = \Theta s, s \in A^M\}$ possesses the following *full diversity property*:

$$s_i \neq s'_i \Rightarrow [\Theta s_i]_k \neq [\Theta s'_i]_k, \forall k \in [1, M],$$

where $[\cdot]_k$ denotes the $k$ th entry of a vector. In words, for two distinct blocks, their precoded (rotated) counterparts are different in *all* their components. With this property, if each component $[u_i]_k$ of a rotated block $u_i$ goes through a fading channel, and is thus scaled by an independent fading coefficient $\alpha_n$, then as long as one of the $M$ coefficients $\alpha_n$ is not too small, one can uniquely detect $s_i$ from the rotated vectors $u_i = \Theta s_i$. This signal space diversity can be exploited with multi-antenna transmissions.

Suppose now that the precoded symbols $\Theta s_i$ pass through an ISI-free fading channel modeled by the equation $y_n = \alpha_n u_n + \eta_n$. Using Chernoff bounding techniques, we can approximate the probability of block errors $P_E(u_i \to u_j, i \neq j)$, by $$P_E \approx (G_c \cdot \mathrm{SNR})^{-G_d},$$

where the *diversity gain* $G_d$ is the minimum Hamming distance between the linearly precoded vectors $u_i, u_j \in U$; i.e., recalling that $|\{\cdot\}|$ denotes the cardinality of a set, we have:

$$G_d = \min_{u_i \neq u_j} |\{k : [u_i]_k \neq [u_j]_k\}|.$$

Note that $G_d$ determines the slope of the error rate versus an appropriately defined SNR curve, while the *coding gain* $G_c$ in measures savings in SNR as compared to a fictitious system with error rate given by $(1/\mathrm{SNR})^{G_d}$. Both $G_d$ and $G_c$ depend on the choice of $\Theta$, and naturally a full (maximum) diversity is indeed achieved by precoders satisfying the full diversity property.

Signal space diversity can offer a bandwidth-efficient countermeasure against fading in the sense that it does not reduce the transmission rate. We call our matrix $\Theta$ a linear precoder because it implements a linear transformation, and in order to enable full signal space diversity, it does not have to be unitary. However, there are indeed good reasons that motivate unitary precoders 1) A unitary precoder (UP) does not change the Euclidean distances between input vectors, and hence unitary precoding does not alter performance when the channel is purely AWGN (with no fading); 2) For certain sizes $M$, the "best" precoders in terms of maximizing diversity and coding gains turn out to be almost always unitary. A OFDM system can use unitary precoders (UP), and the resulting OFDM system with UP will be abbreviated as UP-OFDM.

Given the success of error-control coding and the merits of linear precoding in the presence of fading, the system 1200 combine their strengths. Linear precoding alone can achieve a diversity of order $M$ with a well-designed precoder $\Theta$ over a fast flat fading channel. In the limit ($M \rightarrow \infty$), the $M \times M$ precoder $\Theta$ converts a Rayleigh fading channel to an AWGN channel. The price paid is twofold. First, to collect full diversity gains, maximum likelihood (ML) decoding is needed. ML decoding is an NP-hard problem, although the universal lattice decoder (a.k.a. sphere decoder) can approach ML performance in polynomial time. Therefore, linear precoding enables large diversity at high decoding complexity. Second, since the ideal linear precoder with $M \rightarrow \infty$ renders the fading channel equivalent to an AWGN one, its performance is limited by that of an uncoded transmission in AWGN.

For $M = 2$ and $M = 4$, the following precoders have been shown to enable full diversity and maximum coding gain of 1 and 1/2, respectively, for QAM constellations:

$$\Theta_2 = \frac{1}{\sqrt{2}}\begin{pmatrix} 1 & e^{j\frac{\pi}{4}} \\ 1 & e^{j\frac{5\pi}{4}} \end{pmatrix}$$

$$\Theta_4 = \frac{1}{2}\begin{bmatrix} 1 & e^{j\frac{\pi}{8}} & e^{j\frac{2\pi}{8}} & e^{j\frac{3\pi}{8}} \\ 1 & e^{j\frac{5\pi}{8}} & e^{j\frac{10\pi}{8}} & e^{j\frac{15\pi}{8}} \\ 1 & e^{j\frac{9\pi}{8}} & e^{j\frac{18\pi}{8}} & e^{j\frac{27\pi}{8}} \\ 1 & e^{j\frac{13\pi}{8}} & e^{j\frac{26\pi}{8}} & e^{j\frac{39\pi}{8}} \end{bmatrix}.$$

Two nice properties of these precoders are that they enable maximum coding and diversity gains, while all their entries have equal norm $|\theta_{k,m}| = 1/\sqrt{M}, \forall k, m \in [0, M-1]$.

Unlike linear precoding, error-control coding is capable of achieving large coding gains even when the channel is AWGN. When used over Rayleigh fading channels, coding is also capable of offering diversity gains. For example, a linear block code with minimum Hamming distance $d_{\min}$ incurs the following codeword error probability in Rayleigh fading:

$$\mathrm{P_E} \approx \frac{1}{2} A_{d_{\min}} \left(2\frac{E_s}{N_0}\right)^{-d_{\min}}$$

where $E_s$ denotes energy per coded symbol, and $A_{d_{\min}}$ is the number of codewords of weight $d_{\min}$. We deduce from the exponent, that the diversity gain of the code is $d_{\min}$. For convolutional codes, the diversity gain equals $d_{\text{free}}$, the free-distance of the code. For an $(n,k)$ convolutional code with memory $m$, the free distance is upper bounded by $d_{\text{free}} \leq (m + 1)n$. Therefore, for fixed $n$, the free distance can only increase at the price of increasing the memory $m$. However, such a diversity increase, which is at best linear in the memory $m$, will result in an exponential increase in decoding complexity, because the number of trellis states is $2^m$ for binary codes. Combining linear precoding with error control coding offers *multiplicative* increase in diversity: the overall diversity will be the product of the individual diversity orders, as we will show in the next section.

The two interleavers, $\Pi_1$ and $\Pi_2$ of system 1200 serve different purposes. The $\Pi_1$ interleaver 1215 is used to separate the coded bits so that neighboring bits are mapped to different constellation symbols, and finally precoded into different blocks. The $\Pi_2$ interleaver 1230 is used to permute each block of linearly precoded symbols in the frequency domain. At least one of the two interleavers should be large enough so that the correlation of the channel taps in the time domain can be decreased to the model $y_n = \alpha_n u_n + \eta_n$ valid. In some implementations, one can select the size for $\Pi_2$ to be equal to the OFDM symbol size (the number of subcarriers), and choose $\Pi_1$ to have a size larger than the OFDM symbol size. Examples of interleavers include block and random interleavers. For the block interleaver, the symbols are written into a matrix of size $P_1 \times P_2$ row-wise, and the interleaved symbols are read out column-wise. A random interleaver of size P is a randomly chosen permutation among the P! possible permutations of P objects. --.

In the Claims

Column 22, Line 52, in Claim 8, delete “K≥N-L.” and insert -- K≤N-L. --, therefor.

Column 23, Line 11 (approx.), in Claim 13, delete “a encoded” and insert -- an encoded --, therefor.

Column 24, Line 21, in Claim 20, delete “blocks” and insert -- the blocks --, therefor.

Column 24, Line 31, in Claim 23, delete “K≥N-L,” and insert -- K≤N-L, --, therefor.

Column 24, Line 54, in Claim 26, delete “and, where” and insert -- , and where --, therefor.

Column 24, Line 65, in Claim 27, delete “a stream” and insert -- the stream --, therefor.

Column 25, Line 1, in Claim 27, delete “are not” and insert -- that are not --, therefor.

Column 25, Line 4, in Claim 27, delete “output waveform” and insert -- output an output waveform --, therefor.

Column 25, Line 62, in Claim 36, delete “encoded symbols” and insert -- coded symbols --, therefor.

Column 27, Line 28 (approx.), in Claim 52, delete “input stream” and insert -- input data stream --, therefor.

Column 27, Line 31 (approx.), in Claim 53, delete “input stream” and insert -- input data stream --, therefor.